US008665121B2

(12) United States Patent
Shavit

(10) Patent No.: US 8,665,121 B2
(45) Date of Patent: Mar. 4, 2014

(54) SYSTEMS AND METHODS FOR AIRCRAFT FLIGHT TRACKING AND DISPLAY

(75) Inventor: Tsachi C. Shavit, Lexington, MA (US)

(73) Assignee: Cloudahoy, Inc, Lexington, MA (US)

( * ) Notice: Subject to any disclaimer, the term of this patent is extended or adjusted under 35 U.S.C. 154(b) by 339 days.

(21) Appl. No.: 13/073,941

(22) Filed: Mar. 28, 2011

(65) Prior Publication Data

US 2011/0241902 A1 Oct. 6, 2011

Related U.S. Application Data

(60) Provisional application No. 61/282,805, filed on Apr. 2, 2010.

(51) Int. Cl.
*G01C 21/00* (2006.01)

(52) U.S. Cl.
USPC ............ 340/978; 340/945; 340/963; 340/971

(58) Field of Classification Search
USPC ............ 340/978
See application file for complete search history.

(56) References Cited

U.S. PATENT DOCUMENTS

| | | | | |
|---|---|---|---|---|
| 6,259,977 | B1 * | 7/2001 | Mayer et al. | 701/14 |
| 6,606,035 | B2 | 8/2003 | Kapadia et al. | |
| 7,113,852 | B2 | 9/2006 | Kapadia et al. | |
| 2003/0225492 | A1 * | 12/2003 | Cope et al. | 701/35 |
| 2004/0008253 | A1 * | 1/2004 | Monroe | 348/143 |
| 2004/0095466 | A1 | 5/2004 | Galasso | |
| 2005/0174235 | A1 * | 8/2005 | Davis et al. | 340/539.13 |
| 2007/0219831 | A1 * | 9/2007 | Ne'meth | 705/4 |
| 2007/0236366 | A1 | 10/2007 | Gur et al. | |
| 2007/0250224 | A1 | 10/2007 | Dwyer | |
| 2010/0256840 | A1 | 10/2010 | Call et al. | |
| 2011/0246000 | A1 * | 10/2011 | Shavit | 701/14 |
| 2011/0246001 | A1 * | 10/2011 | Shavit | 701/14 |
| 2011/0246002 | A1 * | 10/2011 | Shavit | 701/14 |

OTHER PUBLICATIONS

International Search Report, Patent Application No. PCT/US 11/30689, Filed Mar. 31, 2011, Applicant Cloudahoy Inc. Jun. 1, 2011, 2 pages.
Written Opinion of the International Searching Authority, Patent Application No. PCT/US 11/30689, Filed Mar. 31, 2011, Applicant Cloudahoy Inc. Jun. 1, 2011, 18 pages.
Symbolic Flight Products promotional materials, downloaded via http://www.symbolicflight.com on Jul. 25, 2011, 22 pages.
WiFlight promotional materials, downloaded via https://www.wi-flight.net on Jul. 25, 2011, 28 pages.
Flyvie promotional materials, downloaded via www.flyvie.com on Jul. 25, 2011, 40 pages.

(Continued)

*Primary Examiner* — Travis Hunnings
(74) *Attorney, Agent, or Firm* — Finnegan, Henderson, Farabow, Garrett & Dunner, LLP.

(57) ABSTRACT

Systems and methods are provided for automated collection and analysis of aircraft flight data. In accordance with one aspect, a system for collecting flight data associated with an aircraft is provided to transmit collected flight data to a remote system for storage and processing. In accordance with another aspect, a remote system utilizes received aircraft location data to determine whether an aircraft flight incident has occurred, and to alert appropriate emergency services. In accordance with another aspect, a remote system analyzes received aircraft flight data and quantitatively evaluates performance of a pilot. In yet another aspect, a system is provided for graphical and textual display of collected aircraft flight data and pilot performance evaluation data.

49 Claims, 17 Drawing Sheets

(56) References Cited

OTHER PUBLICATIONS

Star Navigation Systems Group promotional materials, downloaded via http://www.star-navigation.com/terrastar_description.html on May 24, 2010.
AvConnect iPhone Press Release dated Feb. 1, 2010.
Wiegmann, Douglas A.; A Human Error Analysis of Commerical Aviation Accidents Using the Human Factors Analysis and Classification System (HFACS), Feb. 2001.
U.S. Appl. No. 13/073,928, filed Mar. 28, 2011, Office Action mailed Oct. 25, 2013, 18 pages.
U.S. Appl. No. 13/072,868, Office Action mailed Dec. 24, 2013, 31 pages.

* cited by examiner

| Ref. | Segment | Start | Time | Kts |
| --- | --- | --- | --- | --- |
| 950 | ▼ entire flight: 88.2 nm | 05:19PM | 01:20:21 | |
| 951 | ▶ taxi 4123' to RW24 | 05:19PM | 18:23 | |
| | takeoff KMVY/24, 1812' | 05:37PM | 00:27 | 39 |
| | airborne 0.9 nm | 05:38PM | 00:50 | 61 |
| | slow flight 0.3 nm | 05:38PM | 00:18 | 54 |
| 952 | ▶ airborne 86.5 nm | 05:39PM | 56:11 | 92 |
| 953 | ▶ visual Appr. KBED/29 2.1 nm | 06:35PM | 00:21 | 39 |
| 954 | ▶ taxi 3722' | 06:35PM | 03:51 | |

Fig. 9b

SYSTEMS AND METHODS FOR AIRCRAFT FLIGHT TRACKING AND DISPLAY

RELATED APPLICATION

This application claims the benefit of priority under 35 U.S.C. §119(e) of U.S. Provisional Application No. 61/282,805, filed Apr. 2, 2010, the disclosure of which is incorporated herein by reference.

TECHNICAL FIELD

The present disclosure related to systems and methods for tracking flights, and more particularly, to systems and methods for tracking flights, including in real-time, for analyzing the performance of the pilots of these flights, and/or for making suggestions for correcting the human errors made during these flights. The present disclosure also relates to systems and methods for locating airplanes that may have undergone a flight incident.

BACKGROUND

Most pilots, from novice student pilots to seasoned airline captains, seek ways of improving their flying skills and ways to avoid repeating errors in piloting, which they or other pilots have made. Such errors include errors in handling the airplane, such as flying too fast or too slow. They also include errors in executing certain flight procedures, for example, turning too soon or too late, misusing navigational aids and thus not flying along assigned routes, and flying higher or lower than instructed. Every pilot makes mistakes from time to time, and in most cases the mistakes are benign. However, in some instances pilot errors can compromise the safety of the flight. If the pilot is not aware of the mistakes made, he may repeat them, and in some cases the results could be dire.

A 2001 study by the Federal Aviation Administration, entitled "A Human Error Analysis of Commercial Aviation Accidents Using the Human Factors Analysis and Classification System (HFACS)," demonstrated that most airplane accidents are the result of human errors. The percentage is higher in General Aviation (GA), likely because GA pilots on average receive less training than pilots of commercial flights, and also because GA planes, on average, are less equipped than planes used in commercial flights.

With current technology, pilots might be unaware of some of their errors, and thus might repeat them. Aircraft used in commercial aviation, especially those used in scheduled flights, often have systems for informing the pilots about certain human errors, and in some cases, even correcting the errors automatically. But even in aircraft with sophisticated avionics systems, many human errors go unnoticed and may result in an accident. The situation in GA may be worse. Thus, a technology for helping pilots to be aware of and understand their mistakes might increase the pace of pilots' self improvement and increase flight safety. Particularity for GA aviation, such a technology should be affordable.

Embodiments consistent with the present disclosure may mitigate or solve the problems identified above. Embodiments consistent with the present disclosure may provide tools for logging flight data, for collecting additional data relevant for flight analysis, for automatically analyzing data using mathematical, statistical and heuristical methods of that data after the flight has ended, and for presenting that analysis using graphical and textual visualization aids. Embodiments consistent with the present disclosure may be utilized interoperatively, as a comprehensive flight data collection and analysis system.

SUMMARY

One aspect relates to a system for collecting flight data associated with an aircraft. The system may comprise a data logger comprising a memory unit for storing flight data. The data logger may further comprise a processing unit coupled to the memory unit and configured to supply the memory unit with flight data, wherein the processing unit is further configured to reorder and prioritize stored flight data prior to transmission. The data logger may further comprise a transmitting and receiving unit coupled to the processing unit and adapted to transmit stored flight data to a remote system and receive data from a remote system and a global positioning system receiver having an output coupled to provide global positioning data to the processing unit.

Another aspect relates to a system for recording aircraft flight data. The system may comprise means for collecting flight data. Means for collecting flight data may further comprise means for storing flight data, means for transmitting stored flight data to remote means for storing and processing flight data and receiving data from the remote means, and means for processing stored flight data, wherein the stored flight data is reordered and prioritized by the processing means prior to transmission. Means for collecting flight data may further comprise means for receiving global positioning system data.

Still another aspect relates to a method of collecting flight data. The method may comprise collecting aircraft flight data via a data logger, collecting global positioning system data via a global positioning receiver, prioritizing the flight data for transmission, and transmitting the flight data to a remote system. The remote system may comprise a remote system memory, a remote system processor, and a remote system transmitter and receiver.

Still another aspect relates to a non-transitory computer readable medium encoded with a computer program for collecting flight data associated with an aircraft. The computer program may comprise instructions for collecting flight data during an aircraft flight, storing the flight data in a computer readable memory, collecting global positioning data from a global positioning receiver, prioritizing the flight data for transmission, transmitting the flight data to a remote system, and receiving stored data from a remote system.

Still another aspect relates to an aircraft locator system. The aircraft locator system may comprise a data logger configured to obtain aircraft location data and transmit the aircraft location data in a prioritized order. The aircraft locator system may further comprise a server having a server memory unit, a server processing unit coupled to the memory unit, and a server transmitting and receiving unit coupled to the processing unit. The server may be configured to receive the transmitted aircraft location data, determine, based on the received aircraft location data, whether a flight incident has occurred and determine, based on the received aircraft location data, a last known location of the aircraft.

Still another aspect relates to an aircraft locator system. The aircraft locator system may comprise means for collecting aircraft location data. Means for collecting aircraft location data may comprise means for receiving global positioning system aircraft location data, means for storing aircraft location data, means for transmitting stored aircraft location data to a remote means for storing and processing aircraft location data, and means for processing stored aircraft location data, wherein the stored aircraft location data is reordered and prioritized by the processing means prior to transmission. The remote means for storing and processing aircraft location data may receive the transmitted aircraft location data and determine, based on the received aircraft location data, whether a flight incident has occurred.

Still another aspect relates to an aircraft locator method. The aircraft locator method may comprise collecting aircraft location data via a data logger, prioritizing the aircraft location data for transmission via the data logger, transmitting the aircraft location data to a remote system, determining whether a flight incident has occurred via the remote system, and determining, based on the aircraft location data, a last known location of the aircraft.

Still another aspect relates to a non-transitory computer readable medium encoded with a computer program for locating an aircraft. The computer program may comprise instructions for receiving prioritized aircraft location data, determining, based on the received aircraft location data, whether a flight incident has occurred, and determining, based on the received aircraft location data, a last known location of the aircraft.

Still another aspect relates to an aircraft flight analysis and grading system. The system may comprise a server comprising a server memory unit, a server processing unit coupled to the server memory unit, and a server transmitting and receiving unit coupled to the processing unit. The system may further comprise a data logger configured to obtain flight data during a flight of an aircraft or simulated flight of an aircraft and transmit the flight data in a prioritized order. The server transmitting and receiving unit may be configured to receive the transmitted flight data. The server processing unit may be further configured to correct measurement errors in the received flight data, segment the received flight data into flight segments, recognize locations of airports and runways in the flight data used by the aircraft or simulated flight for takeoff and landing, and provide evaluation information about pilot performance in at least one of the flight segments.

Still another aspect relates to an aircraft flight analysis and grading system. The aircraft flight analysis and grading system may comprise means for collecting flight data during a flight of an aircraft or simulated flight, means for transmitting flight data, means for receiving the transmitted flight data, means for storing the received flight data, and means for processing the stored flight data. The means for transmitting may transmit flight data in a prioritized order. The means for processing may correct measurement errors in the received flight data, segment the received flight data into flight segments, recognize locations of airports and runways in the flight data used by the aircraft or simulated flight for takeoff and landing, and provide evaluation information about pilot performance in each flight segment.

Still another aspect relates to an aircraft flight analysis and grading method. The method may comprise obtaining aircraft flight data collected during a flight of an aircraft or a simulated flight via a data logger, transmitting the flight data in a prioritized order via the data logger, correcting measurement errors in the received flight data via a server processing unit, segmenting the flight data into flight segments via the server processing unit, recognizing locations of airports and runways in the flight data used by the aircraft or simulated flight for takeoff and landing via the server processing unit, and providing evaluation information about pilot performance for at least one of the flight segments via the server processing unit.

Still another aspect relates to a non-transitory computer readable medium encoded with a computer program for implementing an aircraft flight analysis and grading method. The computer program may comprise instructions for receiving aircraft flight data transmitted from a data logger collecting data about a flight of an aircraft or simulated flight, correcting measurement errors in the received aircraft flight data, segmenting the received aircraft flight data into flight segments, recognizing locations of airports and runways in the aircraft flight data used by the aircraft or simulated flight for takeoff and landing, and providing evaluation information about pilot performance for at least one of the flight segments.

Still another aspect relates to a flight display system. The flight display system may comprise a server comprising a server memory unit and a server processing unit coupled to the server memory unit, wherein the server memory unit is configured to store flight data and flight evaluation data associated with a flight. The flight display system may further comprise a remote workstation comprising a remote workstation processing unit, a remote workstation memory unit, and a remote workstation visual display unit, wherein the remote workstation is configured to display flight data or flight evaluation data received from the server in graphical or textual format.

Still another aspect relates to a flight display system. A flight display system may comprise means for storing flight data and flight evaluation data associated with a selected flight in a flight database, means for securely accessing the flight database based on user credentials, means for obtaining flight data and flight evaluation data from the flight database, means for processing obtained flight data and evaluation data, and means for displaying at least one of the obtained flight data and flight evaluation data in graphical or text format.

Still another aspect relates to a flight display method performed by a computer. The method may comprise establishing a secure connection with a remote database based on user credentials, retrieving flight data and flight evaluation data from the remote database, and displaying at least one of the flight data and the flight evaluation data in graphical or text form.

Still another aspect relates to a non-transitory computer readable medium encoded with a computer program for implementing a flight display method. The computer program may comprise instructions for establishing a secure connection with a remote database based on user credentials, retrieving flight data and flight evaluation data from the remote database, and displaying at least one of the flight data and the evaluation data in graphical or text form.

BRIEF DESCRIPTION OF THE DRAWINGS

FIGS. 9*a* and 9*b* illustrate results of an exemplary automatic segmentation of a flight, which may be performed by an exemplary automatic flight segment recognizer, and may be presented by a web client in both graphical and in text format.

OVERVIEW

Figure 1:
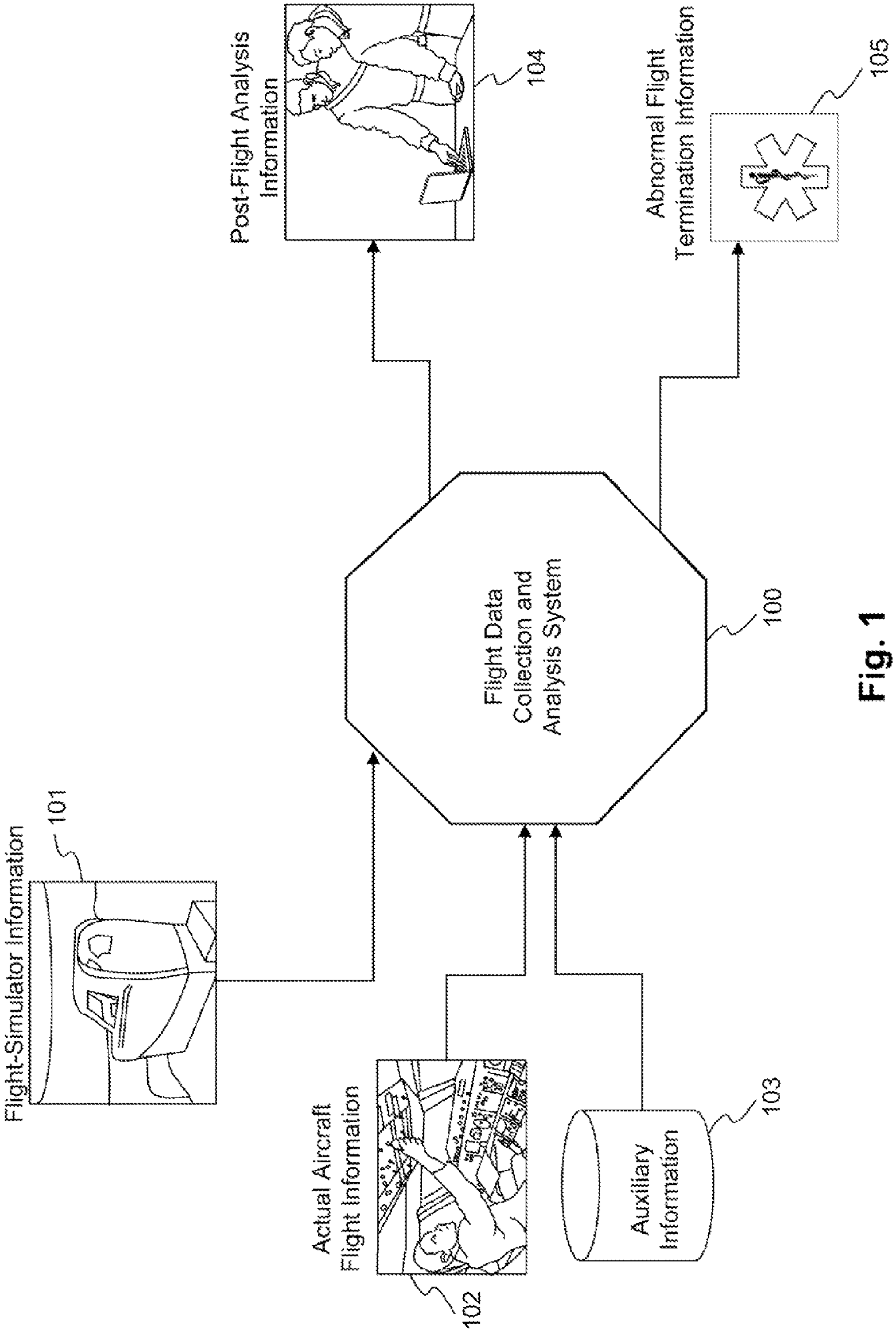
FIG. 1 illustrates exemplary informational flow within an exemplary embodiment of a system for flight data collection and analysis.

According to some embodiments of the systems and methods disclosed herein, a comprehensive flight data collection and analysis system may be provided. For example, FIG. 1 illustrates an exemplary embodiment of a system 100, including exemplary informational inputs and outputs. As shown in FIG. 1, aircraft flight information 102 may be collected and combined with auxiliary information 103 pertaining to aircraft flights, which may include but is not limited to terrain data, weather information, aircraft capability database, airport and navigational instruments' locations, and published flight procedures. According to some embodiments, simulated flight information 101 from a flight simulator may be collected. According to some embodiments, any or all of aircraft flight information 102, auxiliary information 103, and flight simulator information 101 may be transferred into, stored at, and processed by the system 100. According to some embodiments, the system 100 may process such information and may enable pilots and other people to obtain and view post-flight analysis information 104. According to some embodiments, the system 100 may provide abnormal flight termination information 105. The system 100 may present such data and its analysis in various formats, such as formats applicable for people interested in analyzing flights and information applicable for emergency services personnel in charge of locating an aircraft that may have undergone an abnormal flight incident.

Embodiments consistent with this disclosure may be used for providing feedback to pilots about their flights in an actual aircraft or in a flight simulator. Such feedback may help the pilots self-improve. The feedback about a pilot's performance may also be used by people other than the pilot, including but not limited to, flight instructors, flight safety experts, air traffic controllers, and instrument procedures' planners. In addition, some embodiments consistent with this disclosure may be used for an automatic alerting of emergency personnel of a possible aircraft flight incident, such as an accident, collision, crash, overdue arrival, altitude deviation, course deviation, ground proximity warning, loss of transponder information or loss of automatic dependent surveillance-broadcast (ADS-B) information, etc.

Figure 2:
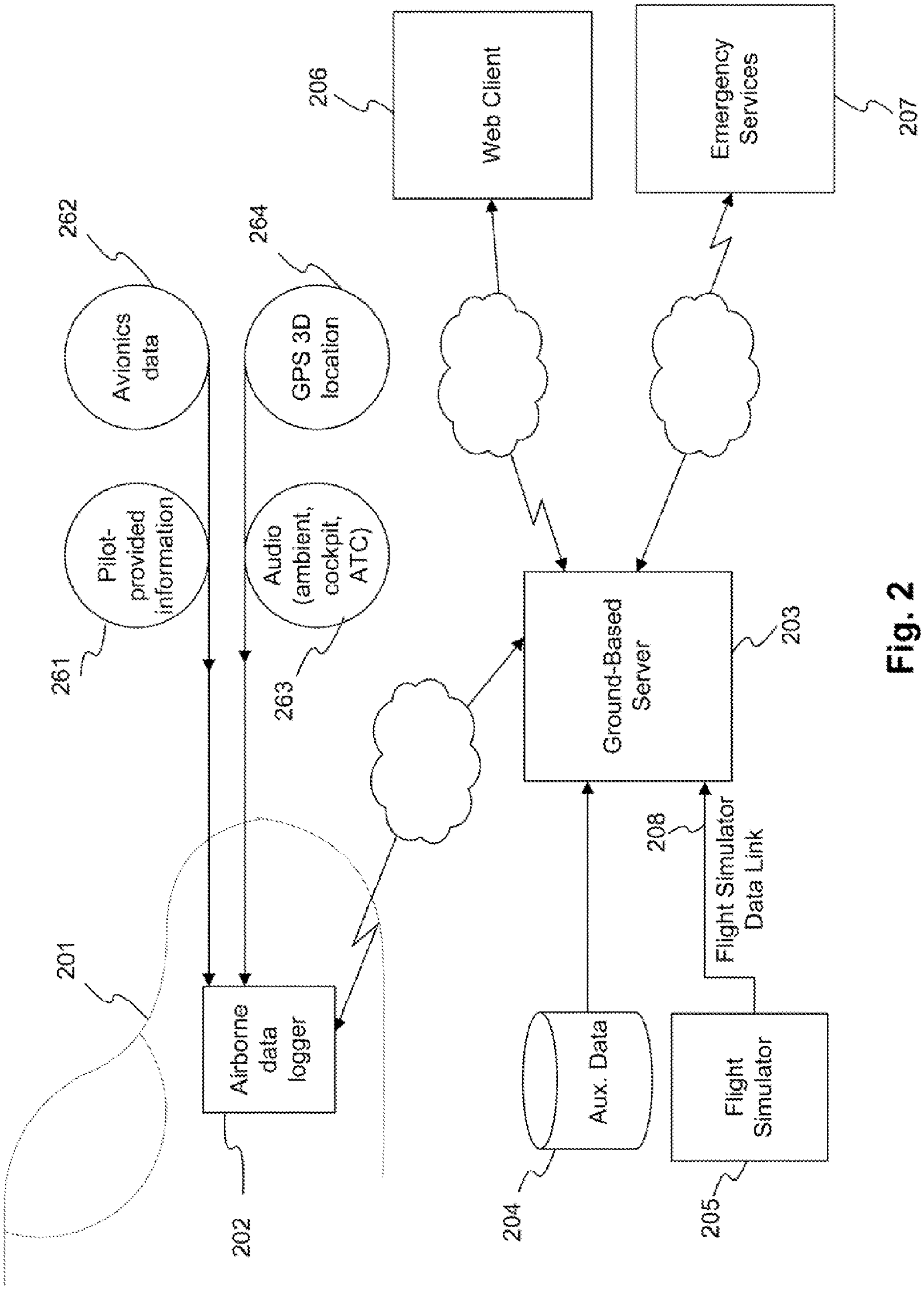
FIG. 2 illustrates exemplary interaction between multiple exemplary components of an exemplary flight data collection and analysis system.

FIG. 2 shows an exemplary overview of the interoperation between exemplary components of an exemplary system 100. System 100 may include means for collecting, storing, transmitting, and receiving flight data, for example, airborne data logger 202 or flight simulator 205. System 100 may include remote means for storing, processing, transmitting, and receiving flight data, for example, ground-based server 203. System 100 may include means for storing flight evaluation data, for example, ground-based server 203. System 100 may include means for securely accessing, obtaining, processing, and displaying flight data and flight evaluation data, for example, web client 206. For example, exemplary airborne data logger 202 may be utilized in an aircraft 201 during flight. Airborne data logger 202 may obtain and store timed location data and other flight parameter data, and transmit them to a ground-based server 203.

Exemplary ground-based server 203 may store flight parameters obtained from at least one airborne data logger 202 and auxiliary data 204 obtained from sources other than airborne data logger 202 and related to at least one flight whose parameters are logged by the airborne data logger 202. Ground-based server 203 may automatically analyze both the data from airborne data logger 202 and auxiliary data 204. According to some embodiments, ground-based server 203 may communicate with at least one web client 206.

Ground-based server 203 may also process data from one or more flight simulators 205 in the same manner as it processes data obtained from an airborne data logger 202. For example, flight simulator data link 208 may transmit simulated flight information to ground-based server 203. Flight simulator data may be obtained when people use a flight simulator for training, and may be used by ground-based server 203 much like data obtained by an airborne data logger. According to some embodiments, flight simulator 205 data, data from airborne data logger 202, auxiliary data 204, as well as the analysis of these data, may be viewed by a user, using a web browser, which may be part of web client 206. Web client 206 may communicate with at least one ground-based server 203. According to some embodiments, web client 206 may display data and analysis related to at least one flight, according to a user's request and authorization.

According to some embodiments, ground-based server 203 may also communicate with one or more emergency services 207, such as a fire department or emergency search and rescue team. Ground-based server 203 may alert personnel or computerized emergency systems to abnormal conditions related to a suspected flight incident, such as an accident, collision, crash, overdue arrival, altitude deviation, course deviation, ground proximity warning, loss of transponder information or loss of ADS-B information, etc.

Flight Data Collection

According to some embodiments, airborne data logger 202 may be carried aboard an aircraft 201 as shown in FIG. 2. Airborne data logger 202 may collect flight data from aircraft 201 and may also generate flight data internally. Airborne data logger 202 may relay collected flight data to ground-based server 203, in real-time or after a delay to the ground-based server. If the communication link is temporarily unavailable, the airborne data logger 202 may store collected flight data locally and broadcast it when communication is available again.

Exemplary ground-based server 203 may aggregate flight data from at least one source of flight data, including data obtained from an airborne data logger 202, data obtained from a flight simulator 205, and auxiliary data 204 obtained from additional data sources, which pertain to at least some collected flight data obtained by at least one airborne data logger 202. Ground-based server 202 may store collected data for later retrieval, and may automatically analyze collected data. Ground-based server 202 may analyze collected data fully automatically, for example, without additional user information. Ground-based server 202 may also analyze collected data with the assistance of additional user information, for example, in order to correlate collected flight data with information pertaining to pilot intentions.

According to some embodiments, airborne data logger 202 may be implemented as a computerized device that collects location information and other flight-related data, stores it, and relays it to ground-based server 203. Airborne data logger 202 may also be implemented as a software application on a portable smartphone, such as an iPhone, which is carried onboard an aircraft during flight. Airborne data logger 202 may also be implemented on a similar device, which may be either portable or embedded in an aircraft 201. Airborne data logger 202 provides a bi-directional data-link to ground-based server 203. The bi-directional data-link may be implemented using wireless data communication including, but not limited to, a cellular data link, a radio data link such as Aircraft Communications Addressing and Reporting System (AGARS), and a satellite data link, or may be implemented using wired communication when the aircraft 201 is on the ground. Airborne data logger 202 may aggregate data, which may be sent encrypted and compressed to the ground-based server 203.

According to some embodiments, data sent from airborne data logger 202 to ground-based server 203 may include real-time Global Positioning System (GPS) information 264, including latitude, longitude, and altitude. GPS information may be acquired via means for receiving global positioning system data, for example, a GPS unit integral to airborne data logger 202, or an external GPS unit connected to airborne data logger 202 via connections such as USB or Bluetooth. The frequency of GPS location sampling may be greater than 1 Hertz.

According to some embodiments, data sent from airborne data logger 202 to ground-based server 203 may also include Wide Area Augmentation System (WAAS) enhanced GPS information. The WAAS is a navigation aid system designed to augment GPS to improve the precision and accuracy of GPS data.

According to some embodiments, data sent to from airborne data logger 202 to ground-based server 203 may also include pilot-provided information 261, such as pilot and co-pilot names, and aircraft serial number ("tail number"). For example, pilot-provided information 261 may be sent to ground based server 203 once only, typically before a flight.

According to some embodiments, data sent from airborne data logger 202 to ground-based server 203 may also include audio information 263, including at least one of cockpit intercom audio, radio communication, and ambient cockpit sound. For example, airborne data logger 202 may receive audio information via an attenuating cable connected to the pilot's headset jack. Airborne data logger 202 may digitize the audio information, store it locally on a data store in the device, and send it to ground-based server 203, optionally in real-time.

According to some embodiments, data sent from airborne data logger 202 to ground-based server 203 may also include avionics data 262 from the aircraft's digital avionics systems, which may be transmitted to airborne data logger 202 via USB cable or via other means. For example, digital avionics data 262 may include at least one of airspeed, altitude, bank and pitch angles, engine RPM, various engine temperatures, and manifold pressure. Digital avionics data 262 may include a flight plan entered into the avionics system by the pilot. In some cases, data from the aircraft's digital avionics system may also include GPS data.

Figure 3:
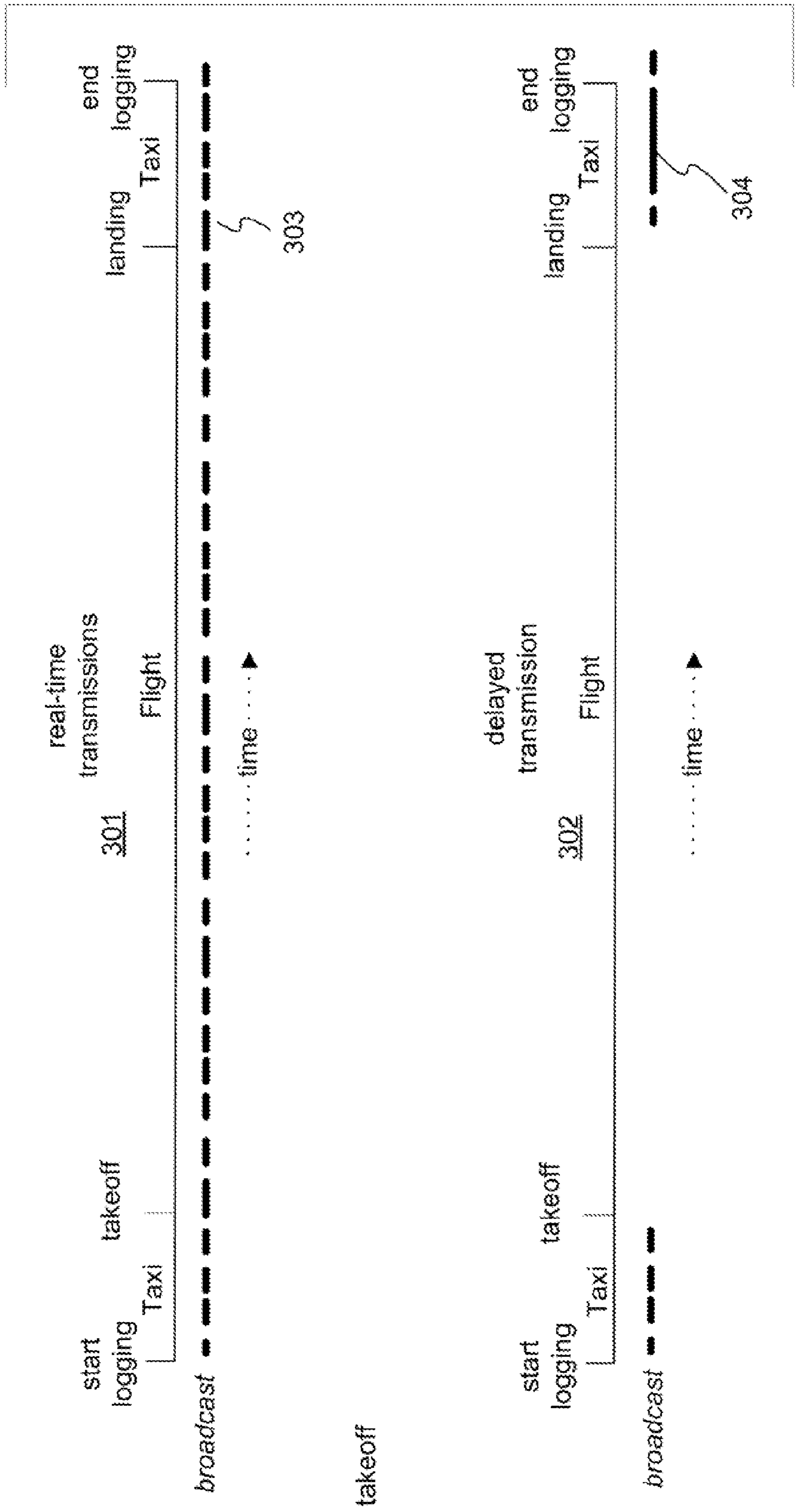
FIG. 3 illustrates two diagrams of exemplary modes of communication between an airborne data logger and a ground based server: a real-time transmission mode and a delayed transmission mode.

FIG. 3 illustrates an exemplary real-time transmission mode 301 and an exemplary delayed transmission mode 302 of airborne data logger 202. For example, airborne data logger 202 may operate in a real-time transmission mode 301, set by the pilot, which broadcasts data in real-time, soon after the data is acquired by airborne data logger 202. Alternatively, the pilot may select a delayed transmission mode 302, wherein flight data is collected, but data transmission is delayed so that data transmission does not occur in real-time, and therefore avoids broadcasting during certain phases of the flight.

In both diagrams of FIG. 3. the horizontal axis corresponds to a time line in which an aircraft starts taxiing, then takes-off, flies, lands, and taxis to its parking space. Each of the thick lines represents the duration of one data transmission. In real-time transmission mode 301, flight data 303 is sent frequently. In such a mode, flight data 303 is collected in memory and then sent in a packet. The size of each packet and the interval between packets may depend on several factors, such as the amount of flight data 303 accumulated since the last packet and the desired frequency of packets per minute.

In delayed transmission mode 302, flight data 304 may be accumulated and stored in the airborne data logger 202, but only transmitted if certain conditions occur. For example, one such condition might be the airspeed of the aircraft. In the example shown in FIG. 3, the accumulated flight data 304 is transmitted only if the aircraft's airspeed is lower than 15 knots (i.e., if the aircraft is not airborne). As illustrated, the duration of the first data transmission after the aircraft has landed is long, because this transmission includes relatively large amount of flight data 304 that accumulated while the aircraft was airborne.

According to some embodiments, in delayed transmission mode 302, flight data 304 transmission is enabled only if the aircraft is flying near stall airspeed. The possible benefit of this mode is that location data would be transmitted prior to the aircraft's landing, and thus, if the aircraft had a flight incident the transmission just prior to the flight incident could help in locating the aircraft.

Figure 4:
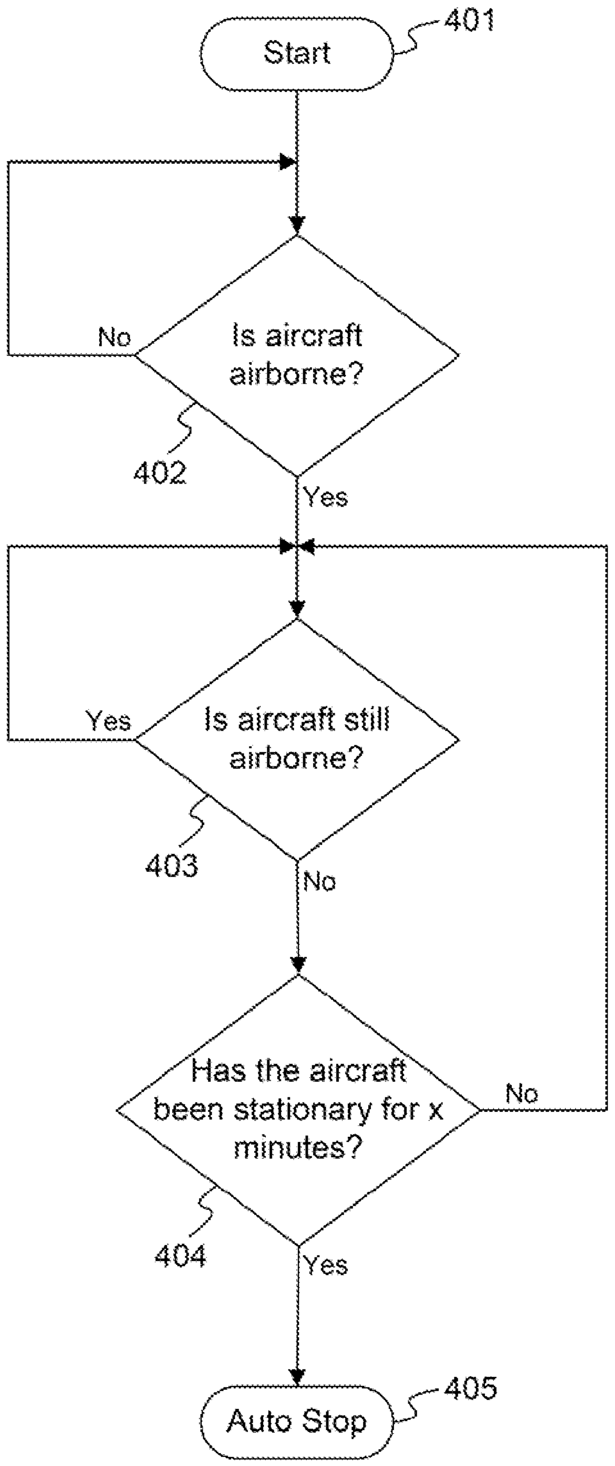
FIG. 4 is a flowchart showing an exemplary implementation of a method for determining whether the logging of data in the airborne data logger should be stopped automatically.

FIG. 4 is a flow-chart of an exemplary embodiment of an auto-stop mode of airborne data logger 202. When an auto-stop mode is selected by the pilot (step 401), airborne data logger 202 begins working in a mode where it waits until aircraft 201 is airborne (step 402) to begin collecting data (step 403). After data collection has begun, airborne data logger 202 repeatedly reassess the flight status of aircraft 201 (step 404). When aircraft 201 is no longer airborne and has come to a complete stop (step 405) for a specified number of minutes, exemplary airborne data logger 202 automatically stops collecting data (step 406).

Referring again to FIG. 2, ground-based server 203 may be implemented in software on Linux, Unix, Microsoft Windows, Apple Macintosh, or other operating systems. Ground-based server 203 may comprise a web server, such as Apache, operating with several proprietary Common Gateway Interface (CGI) programs, which may be implemented in C++, Perl, Python, Java, or other programming languages. Ground-based server 203 software may further comprise components that are not directly connected to a web server. Collectively, components of ground-based server 203 may process flight data transmitted from airborne data logger 202 or from a flight simulator 205 via communication links such as TCP/IP, and store it in a database such as an SQL database. Other components of ground-based server 203 software may manipulate flight data, analyze flight data, convert flight data to various formats, and send the processed flight data via HTTP/S or other communication protocols to at least one web client 206 or emergency service 207. According to some embodiments, software of ground-based server 203 may handle all of the interaction between ground-based server 203 and web clients 206, including a user's sign-in to an account, flight selection, and flight analysis. Ground-based server 203 may also include programs for managing accounts and any databases used by server 203.

Figure 5:
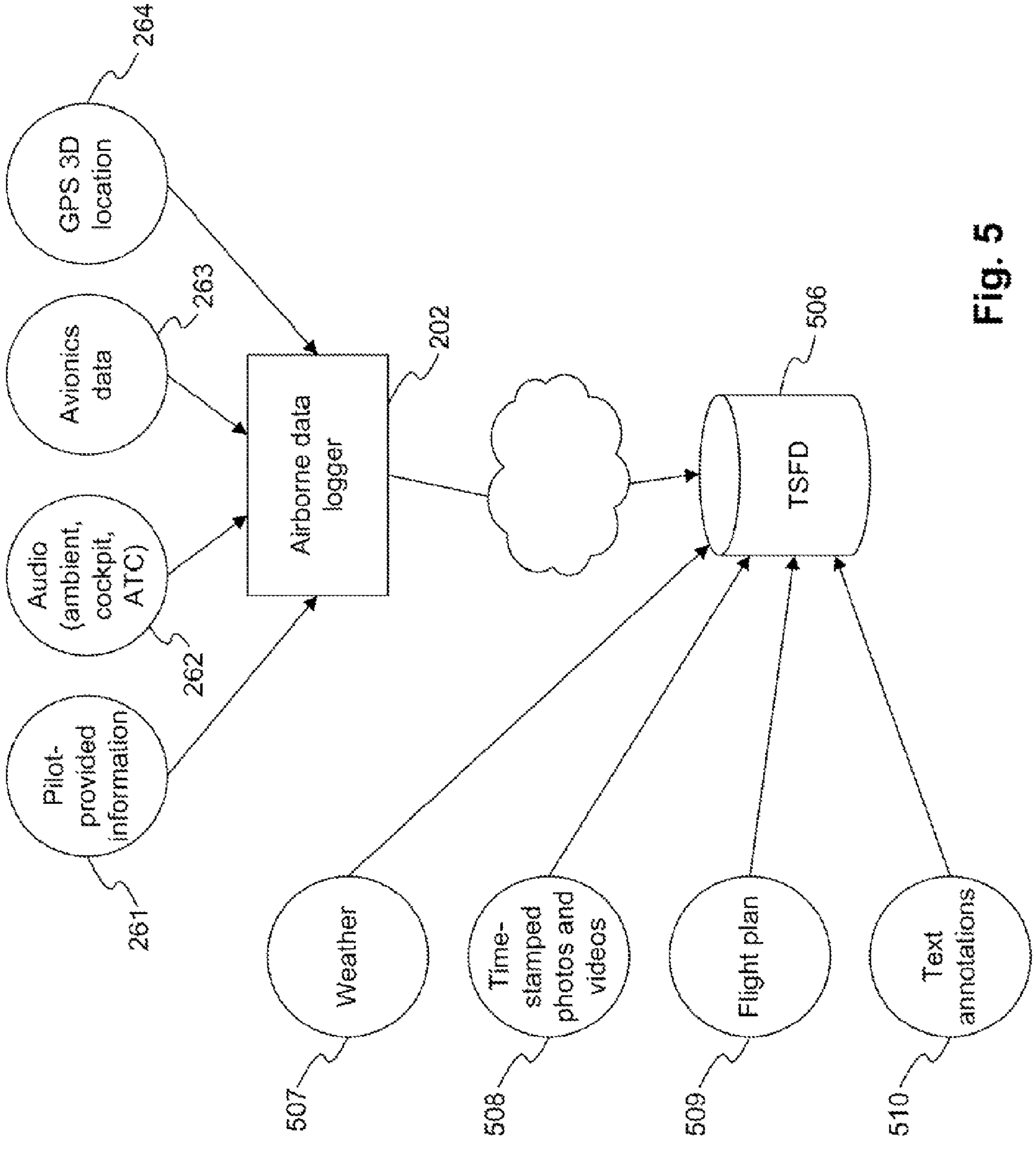
FIG. 5 illustrates various exemplary types of data that may be stored on a ground-based server as Time Stamped Flight Data (TSFD).

FIG. 5 illustrates exemplary Time-Stamped Flight Data (TSFD) 506, as maintained by ground based server 203. According to some embodiments, data arriving from airborne data logger 202 may include the time at which the data was recorded. For example, an audio conversation in the cockpit may be sent digitally together with the time at which it took place. While data from the airborne data logger may be transmitted to ground-based server 203 in any order, not necessarily in chronological order, it may be desirable for ground-based server 203 to access the flight data sorted by time. To carry out its analysis functions, ground-based server 203 may maintain TSFD 506. TSFD 506 comprises per-flight collection of data from different sources, sorted by time.

FIG. 5 illustrates timed data that may be included in the TSFD 506. These data may come from airborne data logger 202 and from other sources. TSFD 506 may include at least one of the following items: GPS 3D location 264 (e.g., latitude, longitude, altitude, optionally enhanced by WAAS); avionics data 263 (e.g., data from the aircraft's on-board avionics systems, such as airspeed, pitch and bank angles, engine RPM and manifold pressure, and piston and oil temperatures); cockpit and air traffic control (ATC) audio 262 (e.g., cockpit conversations, ambient cockpit audio, as well as external radio communications); pilot-provided information 261 (e.g., pilots' names and the aircraft's tail number); weather 507 (information from various external sources about the weather along the flight path, including wind, temperature, barometric pressure, cloud types and bases, and icing); photos and videos 508 taken at various times during the flight; flight plan 509 provided by the pilot and including the actual flight stages (e.g., departure procedures, routes, arrival procedure, and approach); text annotations 510 provided by a web client user and attached to certain time/location points. According to some embodiments, in cases where the engine's RPM is not available from the digital avionics data, engine RPM may be determined by airborne data logger 202 based on ambient cockpit audio data, for example, by performing spectral analysis on digitized ambient cockpit audio.

Emergency Locator

Referring again to FIG. 2, ground-based server 203 may send data (e.g., automatically) to an emergency locator service 207 for use in aiding in a search for an aircraft that may have undergone a flight incident and for analyzing the reasons for the flight incident. Emergency locator service 207 may be implemented in the exemplary manner described below.

Following a normal flight in which the pilot flies aircraft 201 and operates airborne data logger 202, aircraft 201 may experience a flight incident. During the flight, airborne data logger 202 may continuously or intermittently broadcast location information to ground-based server 203. Airborne data logger 202 may continue to broadcast location information after a flight incident. Even in the event that airborne data logger 202 does not survive a flight incident, location information will have already been sent while aircraft 201 was still airborne, immediately prior to the flight incident.

Ground-based server 203 may monitor the location of an aircraft 201 during flight and detect a possible flight incident scenario based on location information. A flight incident detection strategy running on ground-based server 203 and monitoring the flight may trigger a flight incident alert when it detects a potential flight incident, signified, for instance, by data indicating that the aircraft is stationary on the ground at a point that is not an airport, or by communication being lost after a descent. Ground-based server 203 may automatically send messages via HTTP to designated emergency services 207.

Figure 6:
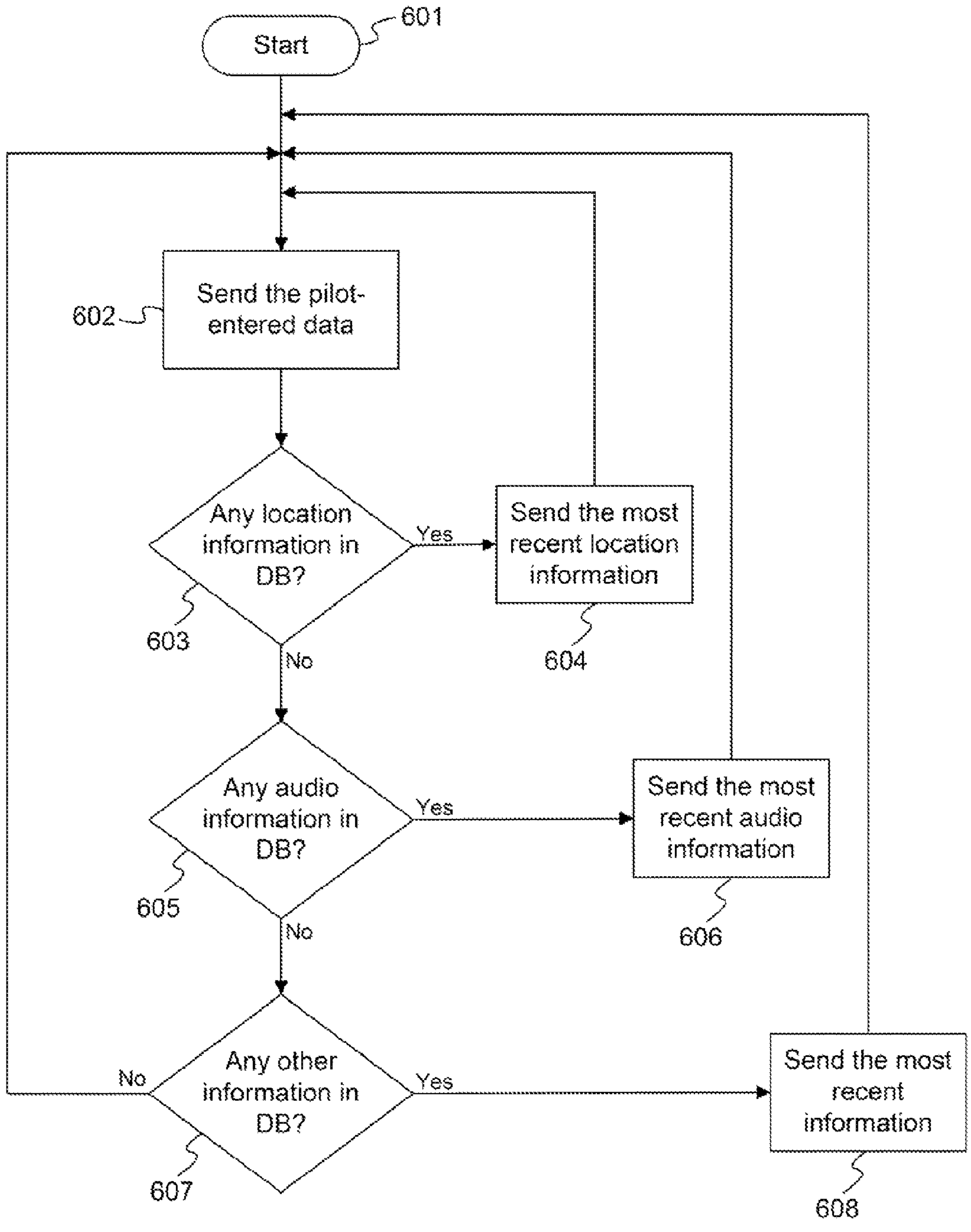
FIG. 6 is a flowchart of an exemplary prioritized LIFO (Last-In-First-Out) method, which may be implemented on an exemplary airborne data logger.

FIG. 6 is a flow-chart of an exemplary prioritized last-in first-out (LIFO) data transmission method of an exemplary emergency locator embodiment. According to some embodiments, airborne data logger 202 may prioritize data transmissions to the ground-based server 203, in a prioritized LIFO fashion. All of the flight data collected by the airborne data logger 202, which may include location and audio, may be stored in a persistent database on the airborne data logger 202, together with the time of data collection. A communication software thread operating concurrently with the other airborne data logger 202 operations may periodically check the database for the existence of collected data to transmit to the ground-based server 203. When such data is found, it may be sent in a prioritized LIFO order. Pilot-entered information may be sent first (step 602). This may occur once only per flight, typically while the plane is still on the ground. If new location information is found in the database (step 603), it may be transmitted to ground-based server 203, so that the most recent information is sent first (step 604). Sent data may be removed from the airborne data logger 202 database to free up storage space. If there is no new location information in the database, the airborne data logger 202 checks for recorded audio information (step 605). If new audio information is present, it may be transmitted to ground-based server 203 in LIFO order (step 506). Audio data that has been sent may be deleted from the airborne data logger 202 database. If there is no new location or audio information in the database, the airborne data logger 202 checks for additional information (such as data from the avionics system) (step 607), which may be sent in LIFO order (step 608). Sent data may be removed from the airborne data logger 202 database. The use of a prioritized LIFO transmission system ensures that, in the event of a flight incident, the most recently collected location information will have been transmitted.

According to some embodiments, the emergency locator may serve to compliment the two widely available locator systems, both designed to broadcast a distress radio beacon after a flight incident on 121.5 MHz or 406 MHz, allowing search teams to detect the signal and locate an aircraft. One such system is Emergency Locator Transmitter (ELT), which is automatically activated when an aircraft has a hard encounter with the ground. Another such system is Personal Locator Beacon (PLB), which must be activated manually by the survivors of a flight incident, and can optionally send GPS location information in addition to the radio beacon. In contrast to ELT, airborne data logger 202 may broadcast location data while aircraft 201 is still in flight, and therefore does not need to survive the flight incident or continue broadcasting while a search operation is ongoing. In contrast to PLB, airborne data logger 202 does not need to survive the flight incident and does not need to be activated by the survivors of the flight incident. Each of these systems (ELT, PLB, and the exemplary emergency locator embodiment of the present disclosure) may have distinct benefits, and using all three may increase the odds of a quick rescue.

Flight Analysis And Grading

Figure 7:
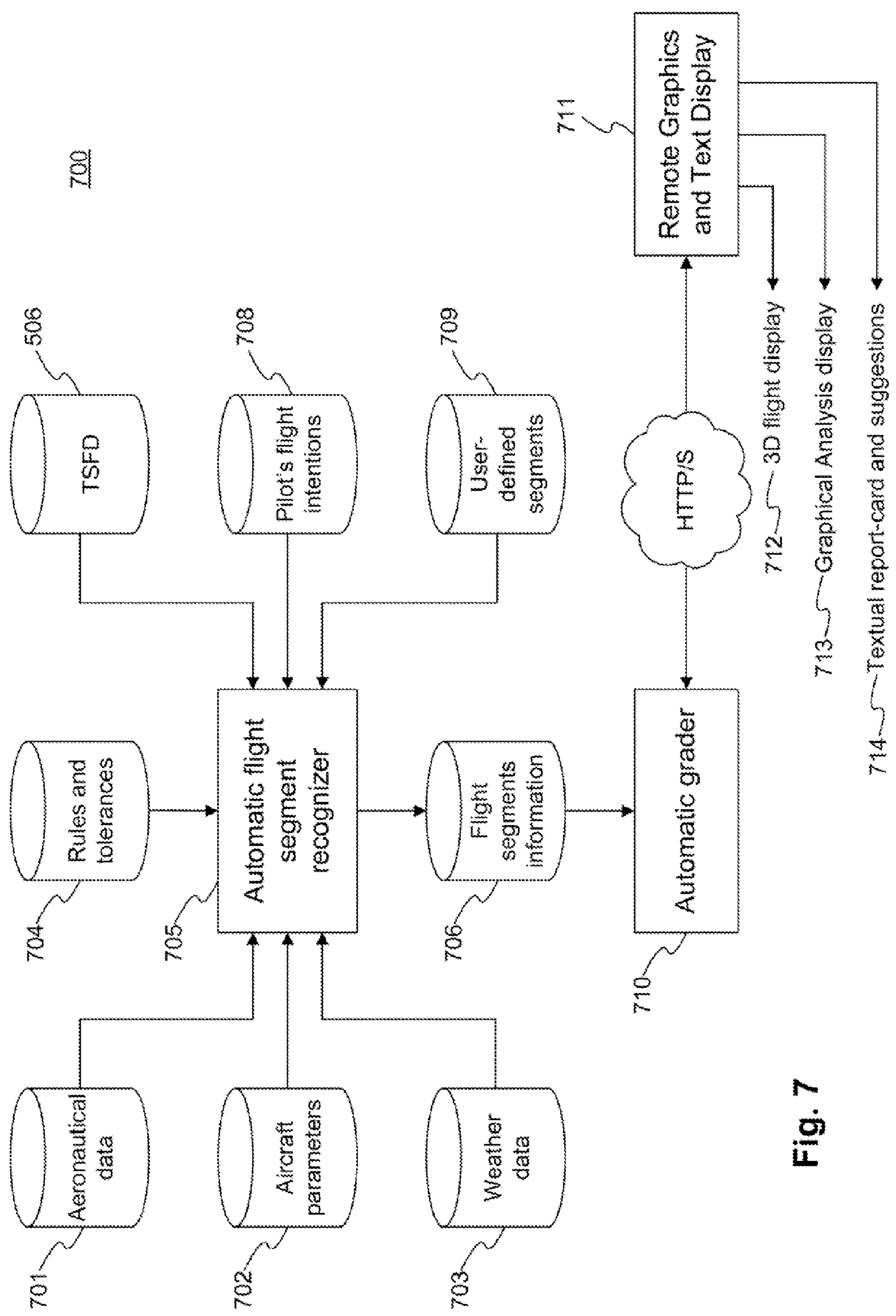
FIG. 7 illustrates exemplary relationships between exemplary components of a flight analyzer.

FIG. 7 illustrates an exemplary relationship between exemplary components of an automatic flight analyzer 700 for providing analysis of collected flight data. Exemplary flight analyzer 700 may be implemented as a plurality of software modules running as part of ground-based server 203 or web client 206. Flight analyzer 700 may comprise three parts: automatic flight segment recognizer 705, automatic grader 710, and remote graphics and text display unit 711. Data may be presented to a user operating web client 206, and such presentation may include, but is not limited to a 3D flight trajectory display on a 3D depiction of terrain or of an aviation map; a 3D depiction of the analysis of the flight; and textual information to inform a user of potential problems in the flight and to optionally provide suggestions for improving. Additionally, web client 206 may include administration software, such as software for administering different user accounts within the system 100.

According to some embodiments, automatic flight segment recognizer 705 analyzes a flight's TSFD 506 and automatically recognizes specific segments 706 of the flight. To perform this operation, automatic flight segment recognizer 706 may use several sources of information. For example, recognizer 706 may use aeronautical data 701 (such as data provided by the National Flight Data Center in the U.S.), which may include, but are not limited to, airport and runway parameters, navigation aids location and characteristics, flight routes, published flight procedures, and airspace boundaries. It may be used to automatically understand the semantics the flight, including recognizing patterns, such as landing on a specific runway of a specific airport.

Some embodiments of recognizer 706 may also use aircraft parameter information 702, which may include, but is not limited to, information about aircraft characteristics, such as stall airspeed in various configurations, maximum airspeed, and recommended takeoff roll and landing airspeeds. Data pertaining to a specific aircraft type may be selected based on the type of aircraft used in a specific flight. This data may be used both by the recognizer 706 and by the automatic grader 710 to analyze aircraft performance and detect potential problems and deviation from standard operating procedures. When a pilot enters an aircraft serial number into airborne data logger 202, ground-based server 203 may look up that number automatically in an on-line registry (such as may be available in the U.S. from the FAA), or retrieve it from a local database. This lookup provides recognizer 706 with information about an aircraft's type. For example, an aircraft with a serial number "N54321" may be recognized by the system 100 as a Cessna 182T. Aircraft parameter information 702 specifically associated with a Cessna 182T may then be provided to recognizer 706.

Recognizer 706 may also use TSFD 506, as described above. For example, recognizer 706 may also use weather data 703, which may include, but are not limited to, timed wind speed and direction at various locations and altitudes along the flight path, as well as other data, such as visibility and cloud ceiling. This data may be used to supplement data obtained by the airborne data logger 202.

Recognizer 706 may also use pilot flight intention data 708, which may contain information about a pilot's "intentions." Such intention data may include, but are not limited to, the flight plan, the intention to follow specific published flight procedures, and type of flight (e.g., cross-country, practice, and using visual flight rules or instrument flight rules). Recognizer 706 may correlate pilot flight intention data 708 with actual flight data.

According to some embodiments, recognizer 706 may also use user-defined segment data 709, which are a list of zero or more segments of the flight defined by the user. According to some embodiments, when the user does not provide such data, recognizer 706 may automatically break up the flight data into flight segments, but the user may still add his own segments.

According to some embodiments, recognizer 706 may also use rules and tolerances data 704, which are a set of rules for determining the semantics of a flight and their associated numerical tolerances. Rules and tolerances data 704 may permit recognizer 706 to use a computerized expert system to group contiguous flight data points into a given segment, and associate semantics (e.g., "takeoff") to the segment. A default set of rules and tolerances data 704 is provided and may be enhanced or modified by a user, to enhance the capacity of recognizer 706 capabilities to identify flight segments associated with a pilot's mission.

Figure 8:
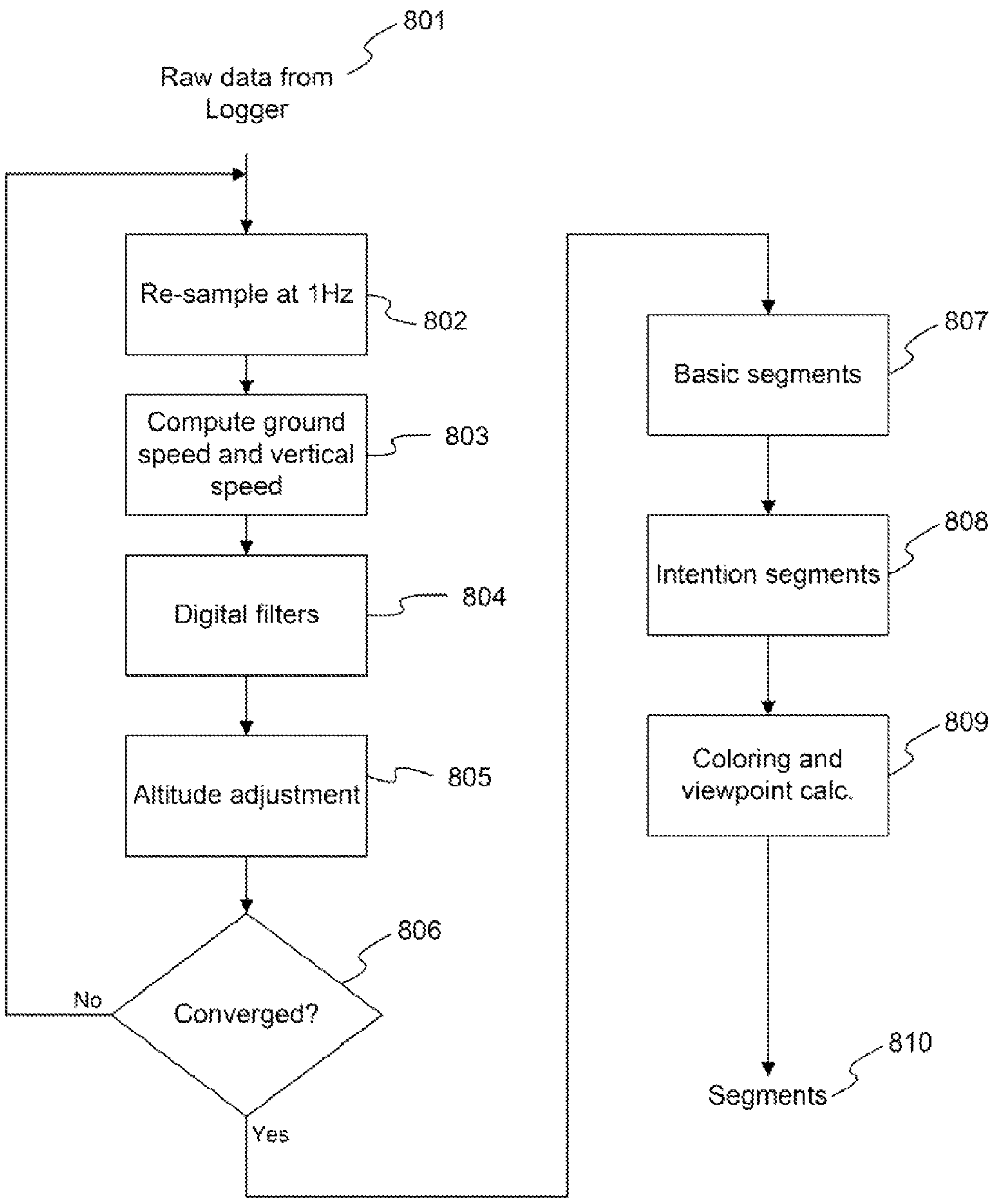
FIG. 8 is a flowchart of an exemplary automatic flight segment recognizer method.

FIG. 8 is a flow chart illustrating an exemplary data processing strategy of recognizer 706. For example, recognizer 706 may first normalize data and compute essential parameters. This task may require a number of steps. For example, resampling raw data at 1 Hertz may be performed at step 802 (raw data may typically be sampled at higher rates, such as from 1 to 3 points per second). Ground speed and vertical speed may be computed at step 803 from GPS location and altitude data. If airspeed information is not provided by the flight data collection unit 202, it may be estimated from the computed ground speed and the wind velocity information obtained from the weather data. Next, the data may be digitally filtered (step 804) to smooth it out and to minimize the effects of measurement errors.

A second task in the exemplary strategy of recognizer 706 may be correcting errors in the GPS altitude information (step 805). When comparing errors of GPS altitude information to errors in the lateral GPS information, there are two error types in altitude measurement that may be addressed by recognizer 706. These two error types may vary in sign and magnitude during the flight. One is a reading offset error (e.g., all reported altitudes may be 55 feet less than the actual altitudes). These errors may be automatically corrected by recognizer 706 because it may correlate the measured altitude when the aircraft is on the ground to the known runway elevation. The other type of error is a synchronization error with the lateral data. For example, altitude data reported at time t may correspond to lateral data reported five seconds earlier. In this example, the altitude data lagging error might indicate that the aircraft's altitude is equal to the runway's elevation 4 seconds after the aircraft took off. Recognizer 706 may address this lagging error by correlating aircraft position with other parameters, such as airspeed, thereby estimating the rotation (takeoff) and landing points. Recognizer 706 may determine (step 806) to execute steps 801-805 in a loop, so as to digitally enhance the data and remove various measurement errors.

A third task in the exemplary strategy of recognizer 706 may be to segment flight data into a set of basic segments (step 807). For example, recognizer 706 may use the aircraft parameter data 702 and aeronautical data 701 to detect transitions from ground-based operations such as a "taxi" section to airborne, and vice versa. This allows the labeling of segments, such as "takeoff", "landing", and "touch-and-go". Such transition and segment recognition may be done using a rule-based expert system and may take into effect factors such as aircraft type and weather. This activity may require backtracking as well. For example, a "climb" segment could be recognized by observing an ordered sequence of points, all having a positive vertical speed. In this example, the "climb" segment could be terminated by another ordered sequence of points all with an average vertical speed of 0, labeled "cruise." By recognizing the average altitude of the "cruise" section, the previous segment could be labeled for example "climb to 16,000 feet, heading 270°," and the cruise section labeled "cruise at 16,000 feet, heading 270°." By using strategies such as those above, recognizer 706 may create a set of basic segments at step 807. These basic segments may be recognized automatically by the system 100 without requiring additional user input.

Using information from the user, another task in the exemplary strategy of recognizer 706 may be to further refine the basic segments into intention segments (step 808). If the user specifies that he used a specific instrument-based approach to landing, recognizer 706 is able to mark the beginning and end of each step in the approach, such as, for example, flying from an initial approach fix to an intermediate fix, executing a procedure turn, intercepting a localizer, and following a glide path radio beacon. The segments created by recognizer 706 may form a hierarchy. For example, recognizer 706 may label all of the data points from the time that the aircraft is stationary on the ramp until it takes off as "taxi", and then further break this segment into sub-segments such as "pause" and "move". Likewise, recognizer 706 may label all of the points from the end of the takeoff to the beginning of the landing as one segment "airborne", then further subdivide this segment into sub-segments corresponding to activities in the flight, such as "climb," "cruise," and "approach-to-landing," optionally further subdividing each of these into subsections, such as "procedure turn," "final," and "missed-approach."

Another task in the exemplary strategy of recognizer 706 may be the labeling of segments, which may include assigning a color code to each segment (step 809), so as to make it easier for a user to view and differentiate between them. Recognizer 706 may also assign recommended viewing angles for each segment, thus allowing a user to quickly set a viewpoint for a segment on a 3D display.

Recognizer 706 may use a knowledge-based expert system to detect the beginning and end of each segment, and to sub-divide segments into further sub-parts. Recognizer 706 may support an open architecture, such that the knowledge-base may be modified by a user to recognize maneuvers specific to that user. As an example, when embodiments of the present disclosure are used in the military, the military may provide unique rules so that recognizer 706 may detect certain military maneuvers specific to a given military training operation.

The exemplary strategy of recognizer 706 may run fully automatically, or may be directed by a user. When directed by a user, a user may specify the type of flight. For example, a cross-country flight typically consists of straight segments with well-defined climb or descent segments interleaved between level-flight segments. On the other hand, a training flight might include various maneuvers that are not necessarily done along straight lines. When a user specifies a training flight, the segmentation process may not try to find the regularity of the segments of a cross-country flight. Furthermore, recognizer 706 may be provided with a user's tolerances to override the default tolerances used by recognizer 706 for various tasks such as recognizing a straight and level flight.

Referring again to FIG. 7, exemplary grader 710 may analyze flight segments generated by recognizer 706. Additionally, grader 710 may use pilot flight intention data 708, such as the specific instrument approach used for landing or the missed approach maneuver used, to grade the actual flight's operations as compared to the intended flight's operations. Grading may be done both automatically and/or with regard to specific pilot intentions.

According to some embodiments, automatic grader 710 may compute the parameters and consistency of certain flight operations, such as climbing, descending, take-off, landing, and/or cruising. For each, grader 710 may verify parameters such as the consistency of the climb/descent rate, the consistency of maintaining a heading, and/or the consistency of turns. "Consistency," in this context, means how accurately a pilot maintains the parameters of a given operation. For example, if a pilot descended from 15,000 feet to 7,000 feet, grader 710 may compute the average descent rate in feet/minute, how much the pilot deviated from that rate, and whether or not the pilot overshot the target altitude (e.g., descended to 6940 feet before leveling off at 7000 feet).

Given the pilot's intentions, grader 710 may check how accurately those intentions were flown. For example, a pilot on an Instrument Flight Rules (IFR) flight plan could be instructed to depart from an airport using a specific published departure procedure. Flying the procedure may require precise tracking of a given ground course as specified by the procedure, climbing at climb rates as specified in the procedure, maintaining certain minimum altitudes at certain points, and leveling off at specific points as instructed by an air traffic controller (ATC). After a user provides grader 710 with intention data 708 indicating that the intent was to use the specific published departure procedure, grader 710 may compute how well the procedure was flown and the piloting errors and procedure violations that were made, if any.

As another example, if grader 710 is provided the information that a flight was conducted under visual flight rules (VFR), grader 710 may analyze the landing maneuver and provide information about flying the traffic pattern, such as how consistent the altitude was on the downwind leg, how close it was to the airport's pattern altitude, and how close the airspeed was to the recommended airspeed for the aircraft type.

For each stage of a flight, grader 710 may compute a numeric grade, reflecting the consistency of the pilot's performance on that stage. For example, it may compute how consistently maintained were flight parameters, such as altitude, airspeed, and climb rate, and how close they were to the desired or required parameters. In addition, it may generate a textual description with more information. Collectively, such grades may help a user measure his progress as he applies feedback from the system 100 to improve his piloting skills.

For aircraft equipped with an automatic pilot, some of the grading described above may grade the performance of the automatic pilot rather than that of the human pilot. Such information may be less relevant for the self-improvement of the pilot, but nevertheless may be desirable for at least three reasons. First, it may provide information about whether the pilot programmed the automatic pilot correctly; second, it may provide the pilot and other users with feedback about the performance and reliability of the automatic pilot; and third, it also may provide an evaluation of the pilot's actions controlling certain aspects of the flight, which are not directly controlled by the automatic pilot. For example, most automatic pilots of small to medium-size aircraft do not control the throttle and the propellers' RPM, and thus, the pilot is responsible for maintaining safe power settings consistent with the desired airspeed. Grader 710 may check and grade the pilot's performance in maintaining correct airspeed. Many accidents have occurred in situations where the aircraft was controlled by an automatic pilot, but the human pilot failed to maintain adequate power, resulting, for example, in a stall during landing. If such a stall leads to an accident, the information about the error would likely be known. Without using automatic flight analyzer 700, however, stalls or "near stalls" resulting from a pilot's error from which the pilot managed to recover might not be known or reported, even if the aircraft was on a commercial flight and the error endangered the lives of many passengers.

Grader 710 may use various strategies for computing how well the pilot performed. It may also be opened for third-party implementers, who may wish to plug in their own strategies for addressing situations that are not addressed by system 100.

Aircraft Flight Display

Referring again to FIG. 2, ground-based server 203 may communicate collected flight data and flight data analysis to web client 206 for a user. Web client 206 may be implemented as a software program running in a web browser, such as Microsoft Internet Explorer, Mozilla Firefox, or Apple Safari, running under operating systems such as Microsoft Windows and Macintosh OS. Web client 206 may be implemented in JavaScript or other programming language, and may permit users to perform various tasks, such as remotely logging into ground-based server 203, selecting and editing flight data, and displaying collected flight data in various formats, including, but not limited to, overlaying it on satellite imagery or aviation maps, using such tools as Google Earth, in 3D. Web client 206 may also permit flight schools to support a learning style in which student pilots may share their flight information with their Certified Flight Instructor (CFI). Web client 206 may provide automated and manual tools needed for post-flight analysis. Such tools may be used by the pilot, by a flight instructor, by peers, the pilot's employer, insurance companies, air traffic controllers, planners of instrument approach procedures, and others. Web client 206 may be used by pilots at all levels, from student pilots to GA pilots, to seasoned commercial pilots.

According to some embodiments, web client 206 may include software running on a workstation, such as PC or Macintosh computers, communicating with at least one ground-based server, and providing a user with capabilities for viewing the flight data in text or graphics mode and analyzing various aspects of it. Web client 206 may process a user's request, pass it to ground-based server 203, and then display for the user the results of the processing performed by ground-based server 203.

Web client 206 may provide users with secure access to flight data and analysis on ground-based server 203, presenting the data in various formats, letting the user interact with ground-based server 203, affect its operation, and modify its data. Web client 206 may use HTTP or HTTPS protocols to log-in and interact with ground-based server 203. The log-in may allow the user to access information based on the user's credentials, as determined by the web client 206 software running on the workstation.

In some embodiments consistent with the present disclosure, web client 206 may initially allow access to flight data only to the pilots of the flight and permit these pilots to share any of the data of their flights with others, either manually (per-flight) or automatically (e.g., a student pilot may setup an automatic share of all his flights with his instructor). Such sharing may be done with other system users and may permit a user to see a list of flights shared with him by other pilots.

Another type of sharing may be with people who do not have an account. Such sharing may be done, for example, by a pilot of a flight by using a special URL generated by web client 206 or ground-based server 203, and may allow a person using this URL to have access (read/only or read-write) to a specific shared flight. An additional embodiment consistent with the present disclosure may allow the pilot to share a flight using a social network, such as Facebook, by presenting to the pilot icons that automatically share the flight using the social network tools. Still another embodiment may permit a pilot who shared his flight this way to "unshare" a flight (i.e., disallow further access to the data). This may be done by an interface in the web client that invalidates the URL or the social network sharing mechanism, such that using the URL after the data is unshared results in an error message rather than access to the flight data.

Figure 9A:
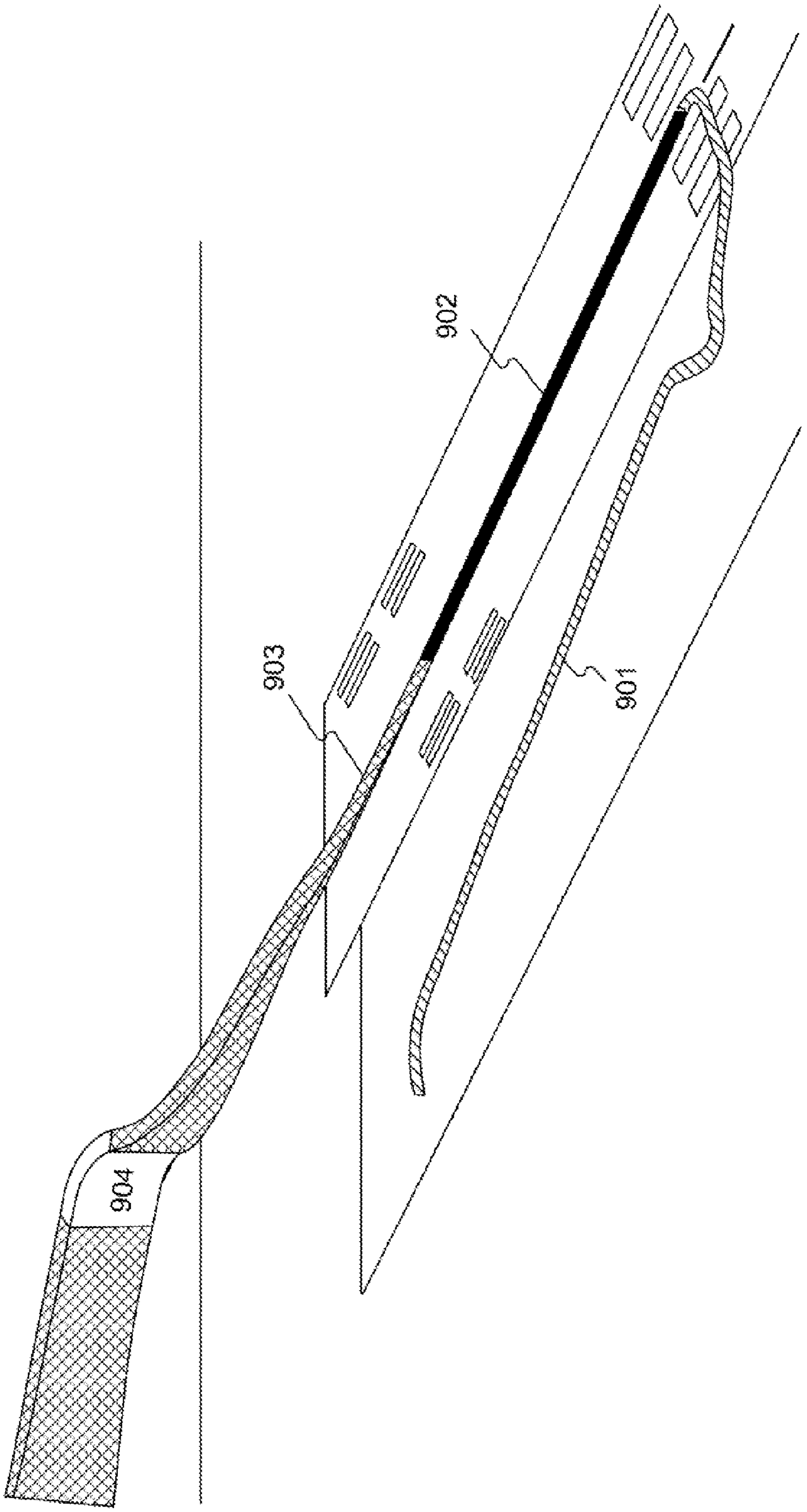

FIGS. 9*a* and 9*b* illustrate an example of a display of automatically recognized flight segments by web client 206. In the illustrated example, a potentially dangerous situation that may result in loss of control of the aircraft soon after takeoff is highlighted. Web client 206 may provide a graphical display of the 3D flight track, including the ground track and the altitude, using color-coding for the various flight segments. The display may be overlaid on a graphical 3D displaying system such as Google Earth. Backgrounds may be selected by the user and may include terrain photos, obtained from satellites, or maps such as aviation maps including, for example, sectional charts, low-altitude charts, and high-altitude charts. Specific flight segments may also be color-coded. An implementation of this segmentation may use identical color-coding in the text and in the graphics.

FIG. 9*a* shows a taxi segment 901, which may be depicted, for example, in green, followed by a takeoff segment 902, which may be depicted, for example, in gold, followed by an initial climb segment 903, which may be depicted, for example, in blue, followed by a "near stall" segment 904, which may be depicted, for example, in red. Such segmentation may alert the pilot to a potentially dangerous situation that occurred immediately following takeoff, when the aircraft's speed was too low, which could have resulted in loss of control at a low altitude above the ground. FIG. 9*b* shows the same segments in an exemplary alphanumeric display, where each line corresponds to one segment in the graphical display and may have a color identical to that of the graphical segment. Segments may be hierarchical, i.e., contain sub-segments. In FIG. 9*b*, the entire flight is described in one segment, as exemplified in the first line, which is further refined into sub-segments exemplified in subsequent lines. Each sub-segment may be hierarchical as well, containing sub-sub-segments, etc. Hierarchical segments may be displayed with a hierarchy indicator such as exemplified by 950, and a user may open and close hierarchy level displays in order to expose or hide different levels of details. In FIG. 9*b*, the top-level hierarchy is opened, as indicated by the down arrow 950, but other hierarchical segments under it are closed as indicated by right arrows 951, 952, 953 and 954. In this example, a user may click the airborne hierarchy symbol 952 and obtain a display of sub-segments detailing cross-country flight operations such as climbs, cruise at different altitudes and headings, and descents. Likewise, clicking the right arrow 953 may provide details of the visual approach, for example flying the various legs of the flight traffic pattern, and landing.

Figure 10A:
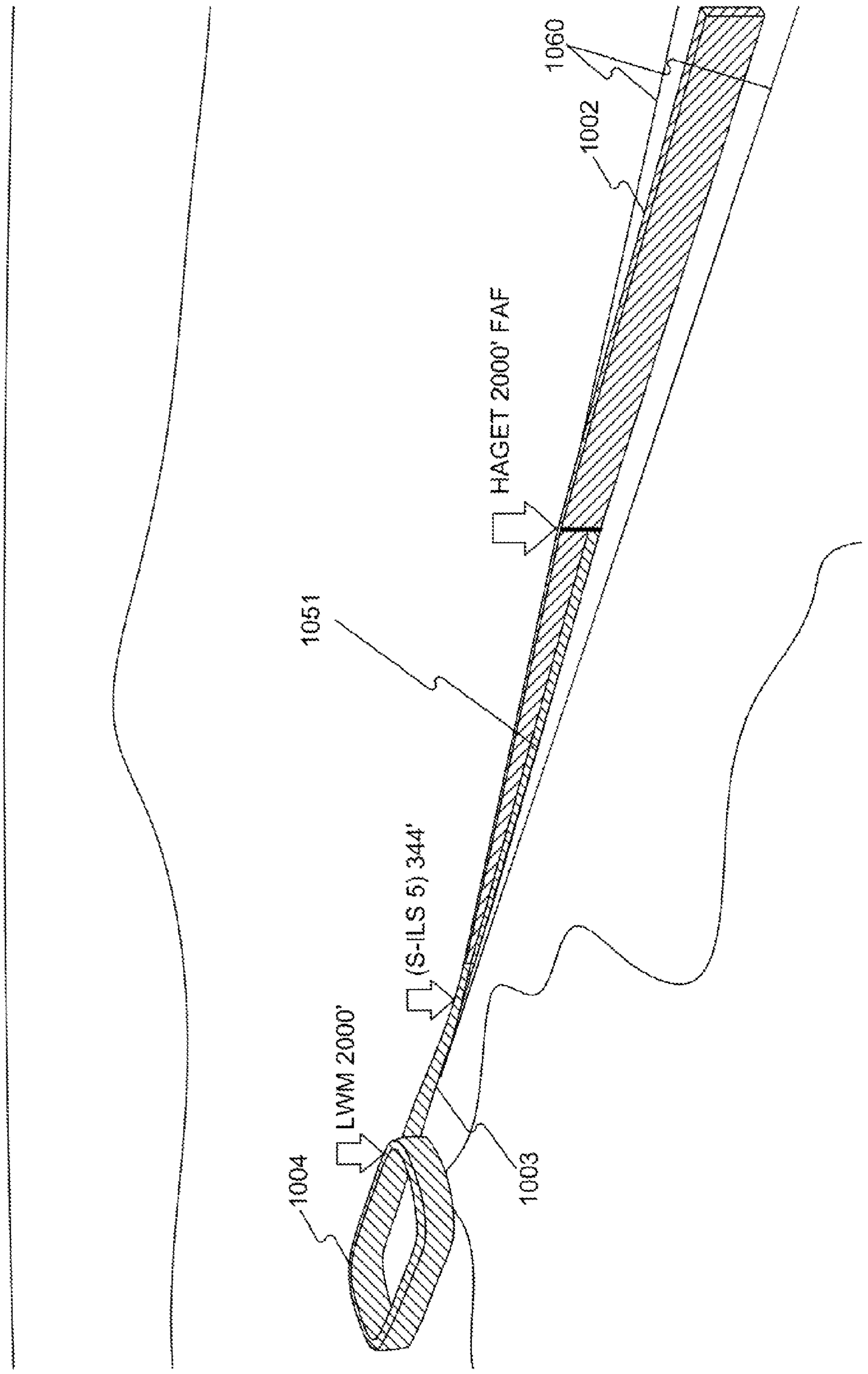
FIGS. 10*a* and 10*b* illustrate an exemplary implementation of the graphical display of an exemplary required flight path vs. an actual flight flown by a pilot.
Figure 10B:
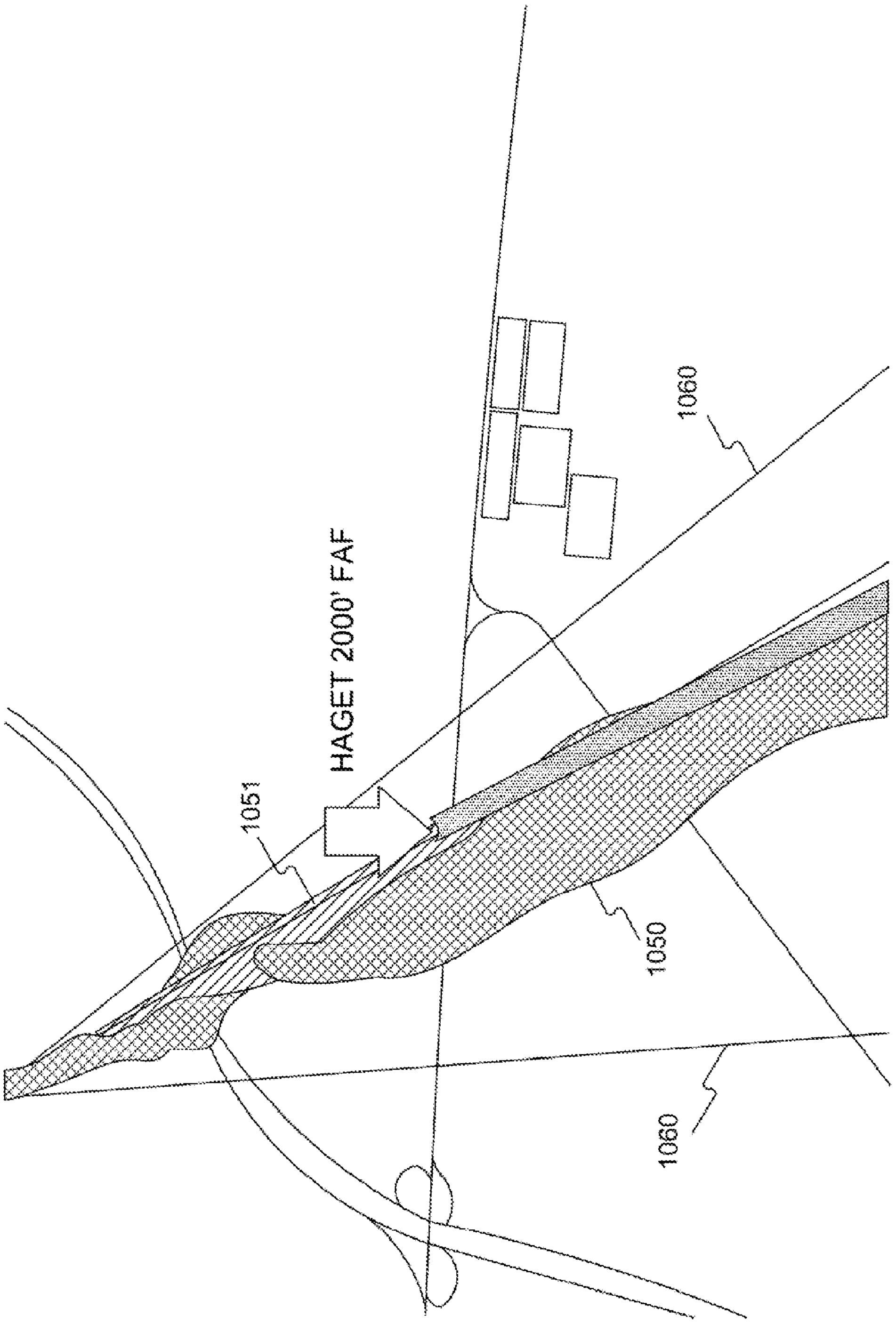

According to some embodiments, web client 206 may provide a graphical display of the actual flight vs. the intended route. In FIGS. 10*a* and 10*b* an Instrument Landing System (ILS) procedure is visualized together with an actual flight path computed from collected flight data. For example, when analyzing an approach for landing using an instrument landing system navigation aid, the actual 3D flight track may be displayed together with a 3D display of localizer and glideslope radio beams, so that deviations from an ideal approach are easy to visualize. FIG. 10*a* illustrates an example of an overlay of a published instrument approach 1051 to landing on a 3D satellite image. The instrument approach 1051 depicted is an ILS approach.

Although FIGS. 10*a* and 10*b* are black and white drawings, the various components of the display may be color-coded, with text showing the names of fixes 1002, 1003, 1004, and corresponding minimum altitudes. For example, the flight from the FAF (Final Approach Fix) 1002 to the touchdown point on the runway may be depicted in magenta, while the missed-approach segment 1003 (taken when landing must be aborted and starting at fix 1003 "(S-ILS 5) 344'") may be depicted in green. FIG. 10*b* shows the simultaneous overlaying of an actual flight track 1050 with published approach 1051, and demonstrates the deviation of the actual flight from an ideal approach. By changing the view point, a user may measure lateral deviations from the final course defined by the localizer beams 1060, and altitude deviations from the glide slope (not shown).

Figure 11A:
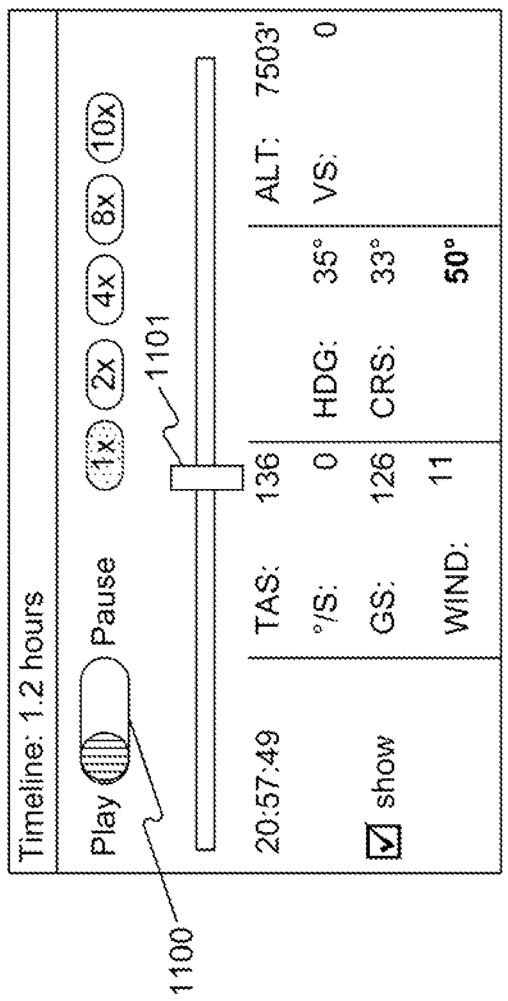
FIGS. 11*a* and 11*b* illustrate an exemplary implementation of a display of flight parameters at a given point and an exemplary animation mode, respectively.
Figure 11B:
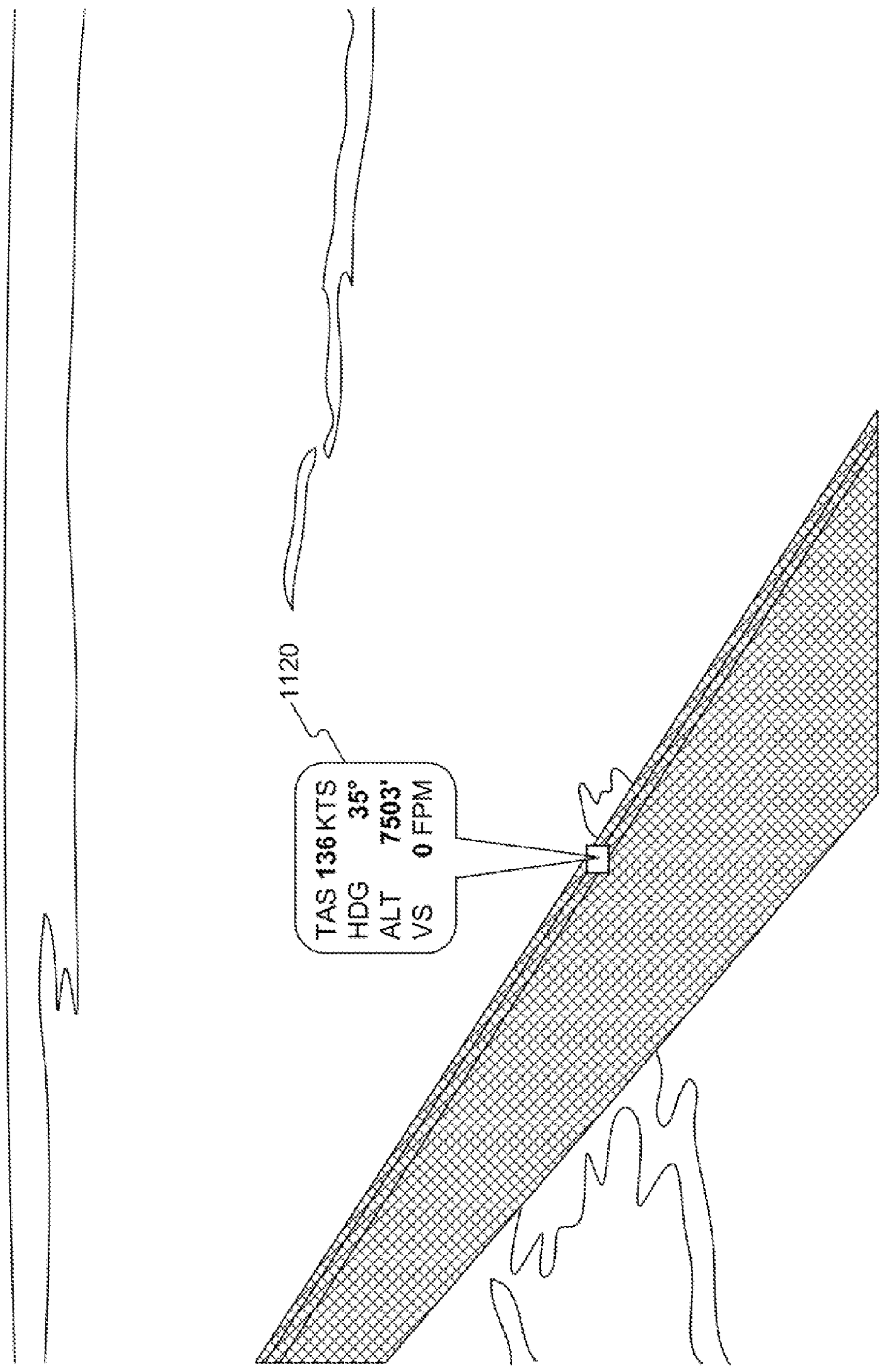

According to some embodiments, web client 206 may provide modes, as illustrated in FIGS. 11*a* and 11*b*, for displaying flight parameters at a given point in time, which might include, but are not limited to, aircraft airspeed, heading, rate of turn, vertical speed, and wind velocity. To see the flight parameters at a given point, a user may drag a slider 1101 on the timeline and see the parameters of the flight at that point. FIGS. 11*a* and 11*b* show that at time 20:57:49 the aircraft was cruising in a straight line at 7,503 feet with a heading of 35°, and a course of 33°, with no vertical speed, with true airspeed of 136 knots, while the wind was coming from 50° at 11 knots. FIG. 11*a* shows a textual display of these parameters together with a slider, and FIG. 11*b* shows a display of some of the parameters in a call-out 1120 on the 3D display of the flight.

According to some embodiments, web client 206 may provide an animation mode in which a symbol representing the aircraft is moved along the displayed flight path while the numerical parameters of the flight at that location are also displayed. The displayed time may be advanced by web client 206 automatically at various speeds selected by the user including real-time (1×), and thus a user may verify the adequacy of the flight parameters for the intended flight by watching a dynamic depiction of the flight. When in an exemplary animation mode, web client 206 may support a mode in which the viewpoint is automatically changed as the animation progresses. Such a changing viewpoint may show the 3D terrain from the point of view of the pilot, or from a fictitious aircraft following the actual aircraft. FIG. 11*a* shows an animation control 1100, which could be set in "Play" mode and automatically change the displayed time-line in various speeds, including real-time (1×), thus showing the evolution of the flight.

Figure 12:
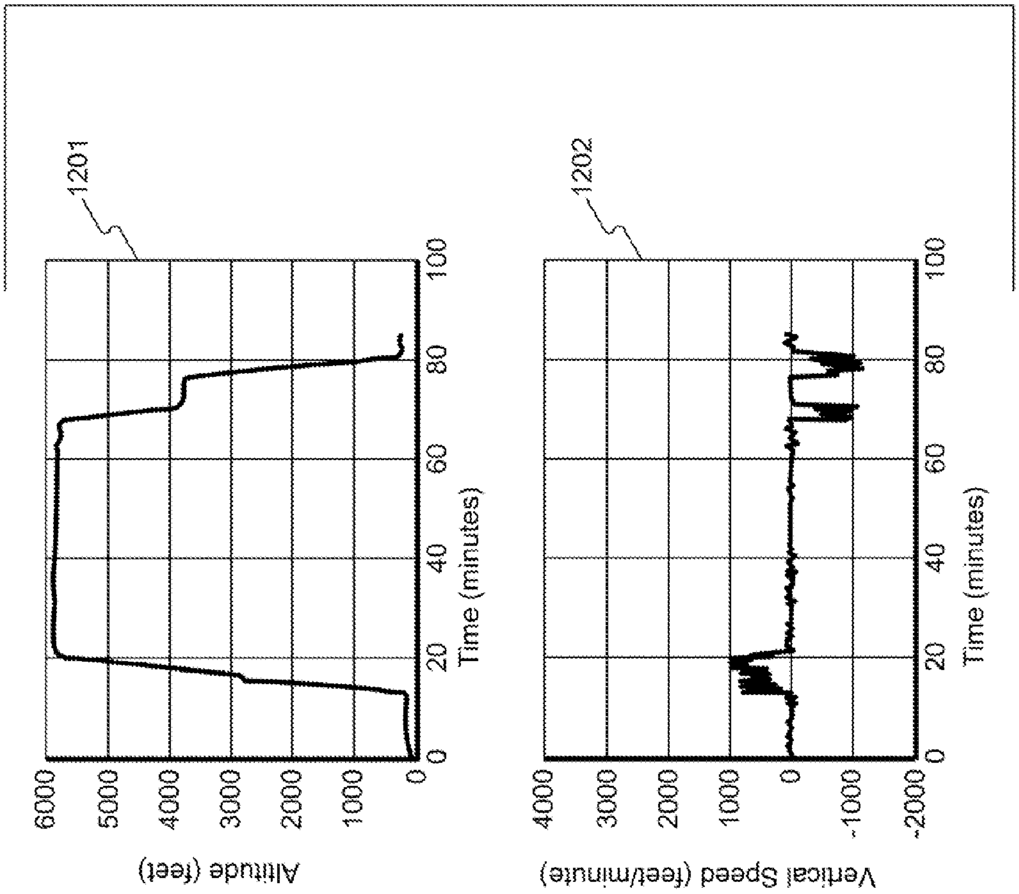
FIG. 12 illustrates an exemplary implementation of a display of graphs showing the change of selected flight parameters in time.

According to some embodiments, web client 206 may provide a mode of displaying graphs of selected flight parameters, such as altitude, against time, as illustrated in FIG. 12. Such a display may encompass an entire flight, or only selected segments of it. FIG. 12 shows exemplary graphs of aircraft altitude 1201 and vertical speed 1202, drawn with a similar time axis. The graphs show the aircraft taxing at the departure airport's altitude, then climbing to its cruising altitude of 6,000 feet at approximately 800 feet/minute, then descending to land in two steps, both at around 1,000 feet/minute. Such graphs may be drawn in different colors, corresponding to the color coding of the corresponding segment display, and may contain a vertical line indicating the position of the slider 1101.

Figure 13:
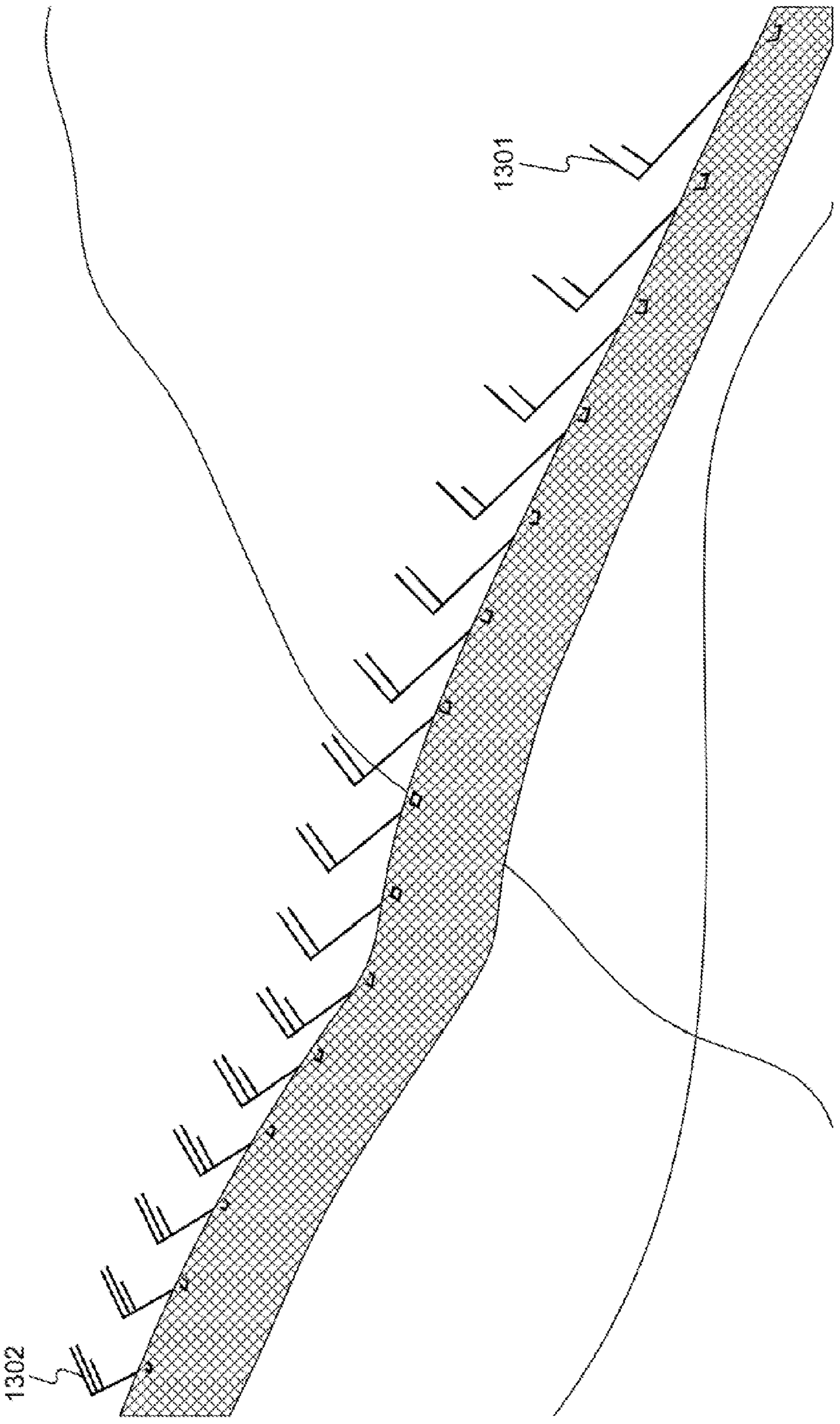
FIG. 13 illustrates an exemplary implementation of a display of wind vectors on a 3D flight track.

According to some embodiments, web client 206 may provide a mode that displays wind vectors along the path of the flight, as illustrated in FIG. 13. Such a depiction helps visualize the affect of the wind on the flight. FIG. 13 shows an exemplary display of wind vectors along a flight path. A wind vector is a common way of depicting the direction and the speed of wind. The aircraft from which the flight path in FIG. 13 was created moved from right to left, was climbing, and encountering a head-wind whose speed increased from 15 knots, as indicated by wind vector 1301, to 25 knots, as indicated by wind vector 1302, representing a moderate wind shear.

According to some embodiments, web client 206 may provide a mode that displays textual reports of flight issues and suggestions, computed by analyzer 700, which may be annotated on the 3D graphical display or in other ways. For example, analyzer 700 may provide web client 206 with data causing it to display a text note at the point on the 3D flight path display where a pilot overshot the final landing decision point, or an alert box where a pilot descended below the allowed minimum altitude for that section. Web client 206 may provide a display of mean and maximum deviations from a given flight path, which may include but are not limited to: maintaining a given heading, following a given ground path such as a localizer beam, maintaining a fixed altitude, correctly executing a holding pattern, and maintaining a given rate of descent that keeps the aircraft on an instrument glide path.

According to some embodiments, web client 206 may provide a mode in which pilots and other designated users may add and edit commentary to the flight page. Such functionality may, for example, help a flight instructor add comments to his student's flight, so that such comments will not be forgotten. Such comments may be attached to a specific point on the flight path, or may refer to the flight as a whole.

According to some embodiments, web client 206 may provide a mode to display a textual "report card" including grades of various aspects of the flight, as well as an overall grade, as computed by exemplary grader 710. Such grades may be computed automatically using default rules and tolerances data 704, or may be graded using user-supplied rules and tolerances data 704. For example, a certain CFI may require his student pilot to maintain level flight at a certain altitude, with altitude changes not to exceed ±50 feet. That particular CFI may provide custom rules and tolerances data so that grader 710 may alert the student pilot of such deviations.

According to some embodiments, web client 206 may provide a mode in which annotations regarding the availability of audio on the 3D flight path are displayed. This may include annotations for the availability of audio recordings such as cockpit conversation or conversations between a pilot and an air traffic controller. Web client 206 may play such recordings when the annotations are selected. Such annotations may be marked on the 3D flight path or in other places on the user interface.

According to some embodiments, web client 206 may support attaching user photos and videos taken along the flight to the flight information. Such a capability may, for example, allow a user to upload into the system 100 multimedia files from devices such as cameras, and have these multimedia files be attached to the flight, for example, as annotations on the 3D flight path. The placement of these annotations may be made manually by the user, and may also be made automatically by the system 100 using a date and time information embedded in the multimedia files. Because devices such as cameras may have a clock that is not synchronized with the flight's time as recorded by the airborne data logger 202, a user may manually locate one such multimedia file on the flight path, and the system 100 would then automatically locate all the other multimedia files using the time difference computed between the multimedia timestamp and the flight time to which the user attached the first multimedia file.

According to some embodiments, web client 206 may provide an automatic pilot logbook display. For example, it may display a list of flights flown by a given pilot in table format, with rows representing flights, and columns representing data per flight, as is common in pilot logbooks. Similar to pilot logbooks, information per flight may include date, aircraft tail number and type, number of takeoffs and landings, origin and destination airports, and total time in the air and in taxi, and such information may be automatically computed and displayed by the system. Full logbook data may include supplemental user-supplied information, such as Hobbs meter, time in Instrument Meteorological Conditions (IMC), Pilot in Command (PIC) information, and other comments.

According to some embodiments, web client 206 may include provisions for sharing data from selected flights with other people. For example, a pilot may want to share his flight data with another user of the system 100, for example, his flight instructor. The system 100 may support sharing of data from flights also with people who are not users of the system 100, by generating a URL allowing the viewing of the flight data, and sending a generated URL using tools, such as an e-mail program or social network programs such as Facebook. The system 100 may allow the person who shared flight data to "unshare" it, for example, by invalidating the URL sent. After "unsharing," using the old URL will result in an error and will not provide information about the flight.

According to some embodiments, web client 206 may include tools for editing published approach procedures. Such editing may modify the database of published flight procedures stored on ground-based server 203, so that flight analyzer 700 is able to use the information for grading the flight, and web client 206 is able to display it together with the actual flight path. Typically, flight procedures, such as Instrument Approach Procedures, are created by government bodies, and are distributed to pilots as "approach plates" or other printed data, containing a graphical and textual description of the procedures. In order for exemplary flight analyzer 700 to be able to use such a procedure, for example, in comparing it to the actual flight flown, the procedure may be converted to a format conducive for a computerized processing of the procedure. Furthermore, the user may use web client 206 to overlay such procedures graphically on the 3D display, for visualizing the deviation of the actual flight from these procedures. For this, web client 206 may provide a tool for creating and editing a textual description of the procedure in a computer language provided specifically for web client 206.

Figure 14:
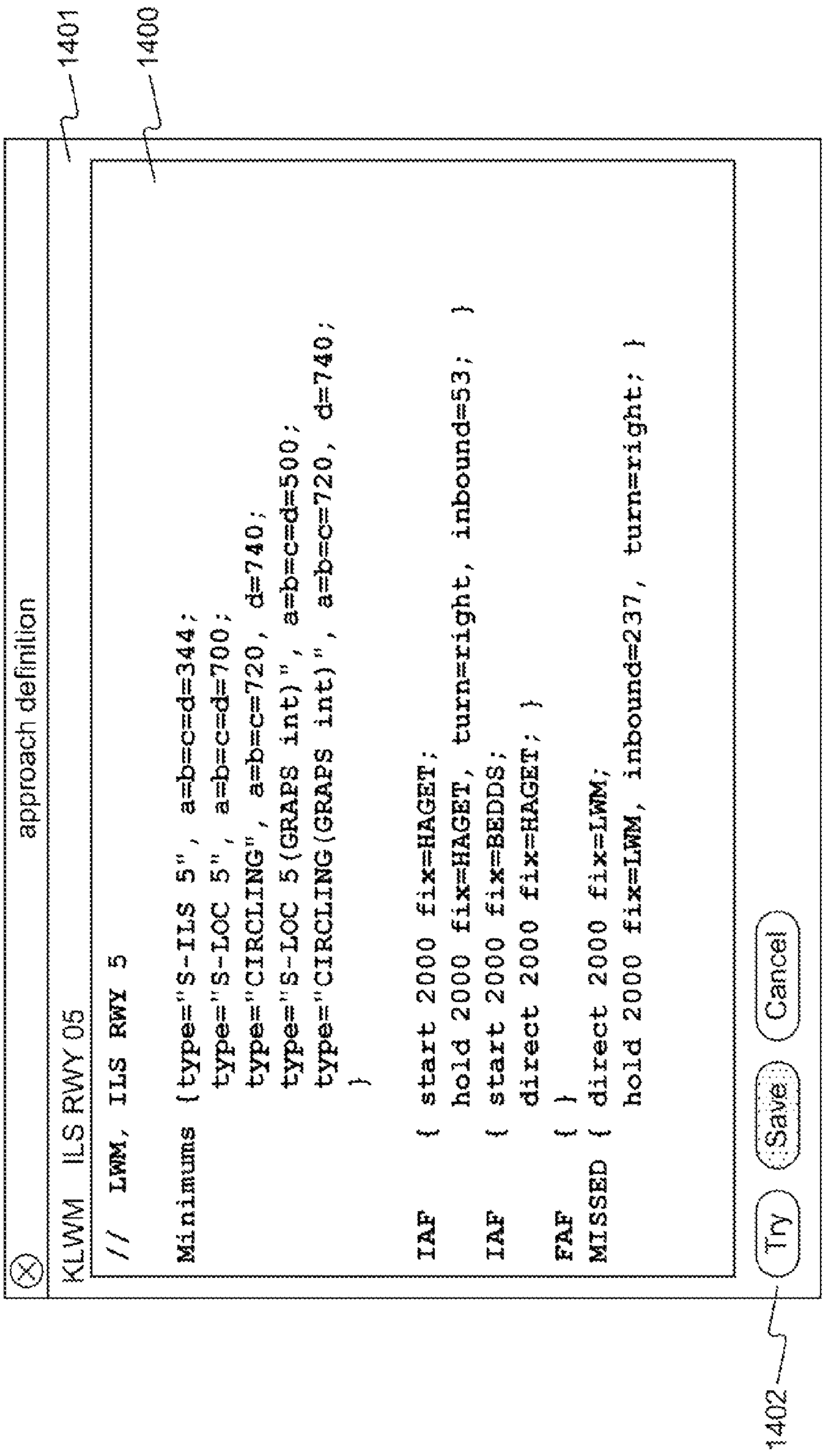
FIG. 14 illustrates an exemplary implementation of an exemplary editor for a published flight procedure.

According to some embodiments, web client 206 may provide a mode of editing such procedures and may support a display of such procedures graphically as well as highlighting errors in the textual computer language describing the procedure, should such errors exist. FIG. 14 illustrates an example of such an editor, having a window 1400 for viewing and editing the textual description of a procedure 1401 for landing on a runway 5 of airport KLWM using ILS, and buttons 1402 for visualizing and saving a new version of a procedure. FIG. 10*a* displays an exemplary result of pressing the editor's "TRY" button, visualizing the procedure 1401 whose textual description is shown in window 1400. The visualization features a 3D depiction of the procedure, with a final approach fix 1002, decision altitude 1003, and missed approach holding fix 1004. The system may compile such textual computer language descriptions of flight procedures into internal data representations, which may be part of the aeronautical data 701. Such information may be used both for analyzing and for grading the flight per the given user intentions 708. It may also be used for displaying the procedures graphically as exemplified in FIG. 10.

To illustrate the use of multiple interoperable exemplary embodiments disclosed herein for a pilot's self improvement, consider the following operations and the pilot's use of the exemplary system 100 during these operations. During preflight, the pilot carries an airborne data logger 202 implemented as an application on a smartphone, such as an iPhone, to the aircraft, activates the airborne data logger 202 application, optionally connects the airborne data logger 202 to additional inputs (such as the pilot's audio system), and if needed, types in or selects his name, the name of the co-pilot if any, and the aircraft's serial number. Before starting any communication with ground control, the pilot clicks a "start" button on the airborne data logger 202 application and secures the smartphone on the aircraft's dashboard.

During flight the pilot carries out the normal piloting operations, such as taxiing, takeoff, cruising, and landing. During that time, airborne data logger 202 stores flight data and optionally transmits it continually to ground-based server 203. No interaction between the pilot and the airborne data logger 202 during the flight is required.

While the aircraft is airborne, ground-based server 203 may receive data from the airborne data logger 202. Ground-based server 203 may store data obtained from airborne data logger 202 in a database and analyze it. Using additional auxiliary data, such as a database of the location of airports and runways and weather information, ground-based server 203 may automatically recognize various aspects of the flight, which may include the specific runways used for takeoff, training maneuvers such as "touch and go," or stall practice, adherence to published procedures such as instrument-based approaches, and taxiing operations.

After the end of the flight, the pilot may manually turn off the airborne data logger 202, or he can operate the airborne data logger 202 in auto stop mode, which stops the logging automatically after landing when the aircraft comes to rest. At a later time on the ground, the pilot can use web client 206 and log into ground-based server 203. Web client 206 may run on a web browser, and therefore, there may be no need to download or install any special software in order to access and view the flight information and its analysis.

Using web client 206, the pilot may select any of his flights for analysis. He may view the flight stages in 3D graphics on a satellite imagery, such as that obtained from Google Earth, or have them displayed in 2D or 3D on an aviation map, view them from different viewpoints, and examine special annotations on the satellite or terrain map display created by exemplary embodiments of the system 100, such as availability of audio recordings at certain points along the path.

Using exemplary web client 206, the pilot may input information about his intentions in the flight. For example, the pilot may have flown an Instrument Flight Rules (IFR) flight in a given route and may have used a specific landing procedure approved by the FAA for landing on a given runway using instruments. Once the system 100 receives information regarding the intentions of the pilot, it may provide the pilot with additional automatic annotations related to the actual execution of the intentions, which may include the deviation of the actual flight from the plan, if any, and can provide grades for the quality of executing the various flight stages.

The pilot and other designated people, such as his flight instructor, may add annotations and commentary to each flight. In that way, the pilot may build a history of flights' documentations and review his progress. The access to such reviews can be enabled to other people, such as people responsible for improving flight safety.

The software running in exemplary airborne data logger 202 may also be adopted for use in simulated flights (flight "flown" on a simulator). This allows pilots to practice flights in a simulator environment and then use the system 100 to analyze their performance. Such use allows seasoned airline pilots who use a simulator to obtain a detailed analysis of their simulated flight. Such a simulated flight may include simulated failures of the aircraft's subsystems, including navigation systems and automatic pilot functions, and the use of some exemplary embodiments of the system 100 will highlight to the pilot how he coped with the emergencies. Similar benefits from post-flight analysis would be available to student pilots using a flight simulator 205 and for licensed IFR pilots who want to improve their skills or maintain their IFR currency by using a flight simulator 205.

To illustrate the flow of information between the various parts of the system 100, consider an example of one possible scenario. A pilot operates airborne data logger 202 and flies a specific flight, during which data is transmitted to ground-based server 203. At the end of the flight, flight analyzer 700 automatically segments the flight stages and grades them. The pilot goes to an office equipped with a workstation, such as a PC running Windows, and connects to the web. He logs into ground-based server 203 using web client 206. This may involve establishing a bi-directional HTTP or HTTPS connection between the workstation and ground-based server 203. Server 203 authenticates the access and provides the pilot with various options. The pilot selects his last flight and a 3D viewing mode. The selection is sent to ground-based server 203, and server 203 sends back to the PC graphical flight data. Web client 206 running on the PC displays the flight in 3D using Google Earth software, which may allow the pilot to zoom, pan, change the angle of viewing, and listen to his conversations with ATC on selected points along the flight path. The pilot may display text boxes on the 3D graphics with information, such as ground and air speed, vertical speed, altitude, and others. The pilot can play back the flight at various speeds and see a simulated flight on the 3D display, including viewing the flight as if it were videotaped from the cockpit. The pilot may enter information into the web client to indicate his intentions (e.g., the procedure selected for landing). This information is relayed to ground-based server 203; ground-based server 203 re-analyzes the data and sends data back to the PC, including graphical data and textual data including grades. At a later time, perhaps weeks or months later, the pilot may compare his performance on that specific flight with his performance on similar flights flown more recently, thus tracking his improvement.

According to some embodiments, pilots may analyze their flights off-line, for example, while sitting in front of a computer screen on the ground, not burdened by the need to fly an airplane. Pilots using some embodiments of the system and method may obtain feedback and guidance from the system, learn from their mistakes and improve their skills. According to some embodiments, the system can be used as a personal coach with nearly unlimited availability, high levels of expertise and patience, and the ability to point out opportunities for self-improvement for commercial pilots, air-traffic controllers, and student pilots.

According to some embodiments, people in charge of flight safety may use the system for analyzing the adherence of pilots to existing flying practices and to regulations, for aiding in developing safety programs, and for monitoring the adherence of pilots to such programs. Pilots and safety personnel can use the system to analyze violations of regulations, including but not limited to: runway incursions, airspace incursions, and deviations from designated flight corridors and assigned altitudes. According to some embodiments, he system may be used by governmental and other bodies for developing new flight procedures, such as instrument-based airport departing and landing procedures.

According to some embodiments, the systems and methods may be used by Certified Flight Instructors (CFIs) in flight schools, on the ground, for visualizing flights flown by their students, and for demonstrating to their students the proper way to fly, navigate, and converse on the radio. According to some embodiments, student pilots may use the system for obtaining feedback after the flight, in an environment more conducive to learning than in a noisy and busy cockpit. Student pilots may track their progress by viewing their execution of certain flight manuevers in different past flights. According to some embodiments, pilots may use the system recreationally for sharing their cockpit experience with friends and colleagues.

According to some embodiments, the system includes logging of flight information, which may be relayed to a ground-based server in real-time. In such embodiments, the system may also aid in locating aircraft that may have undergone a flight incident, for example, by making the aircraft's incident location known to search and rescue teams, and by providing a description of the events leading to the incident, thus aiding in the incident investigations.

One of the advantages of the disclosed comprehensive flight data collection and analysis system according to some embodiments may be that it may be implemented using low cost components, for example, by using low cost consumer hardware components, as well as re-using hardware that many users may already Own, such as smartphones. This may be especially important for GA, where most aircraft owners cannot afford expensive hardware, but may be also an advantage for commercial use.

The foregoing descriptions of the embodiments of the present application have been presented for purposes of illustration and description. They are not exhaustive and do not limit the application to the precise form disclosed. Modifications and variations are possible in light of the above teachings or may be acquired from practicing the invention. For example, as noted above, the described exemplary embodiments include software, but the present application may be implemented as a combination of hardware and software or in hardware alone. Additionally, although exemplary embodiments of the present application are described as being stored in memory, one skilled in the art will appreciate that embodiments can also be stored on other types of computer-readable media, such as, for example, secondary storage devices, like hard disks, floppy disks, or CD-ROM; a carrier wave from the Internet or other propagation medium; or other forms of RAM or ROM.

Other embodiments of the present application will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A flight display system comprising:

a display unit comprising:

a display unit processing unit;

a display unit memory unit; and a display unit visual display;

wherein the display unit is configured to display, in graphical or textual format, flight data and flight evaluation data received from a server configured to store flight data and flight evaluation data associated with a flight, wherein the flight evaluation data includes information about pilot performance based on a comparison between the flight data, including an actual flight path and flight parameters flown, and user-specified intentions defining an intended flight path and flight parameters.

2. The system of claim 1, wherein the flight evaluation data further includes at least one of the following:

quality data;

accuracy data;

data relating to conformance to regulations and procedures; and flight safety data.

3. The system of claim 1, wherein the flight data comprises at least one of the following:

climb and descent rates;

rates of turning;

air and ground speed;

heading and ground course; and audio recordings.

4. The system of claim 1, wherein the flight data and flight evaluation data is shared between multiple users via electronic means including at least one of social networking, e-mail, and url sharing.

5. The system of claim 1, wherein the display unit processing unit is further configured to add new flight procedures defining intended flight parameters and edit existing flight procedures defining intended flight parameters.

6. The system of claim 1, further comprising:

an embedded web application for graphically displaying flight data and flight evaluation data in three dimensions, wherein the web application is configured to graphically display flight data and flight evaluation data from a plurality of selected flights, wherein the displayed flight data and flight evaluation data is segmented into discrete flight portions according to flight activities; and wherein a portion of the graphically displayed flight data corresponding to a particular flight segment is color coded and textually annotated with a portion of the flight data and flight evaluation data corresponding to the particular flight segment.

7. The system of claim 1, wherein the display unit processing unit is further configured to replay selected portions of a selected flight by displaying variations in the flight data or flight evaluation data according to a flight time to which the flight data or flight evaluation data corresponds.

8. The system of claim 7, wherein the display unit processing unit is further configured to display a position of an aircraft on a three-dimensional diagram and adjust a viewing angle in accordance with the displayed position of the aircraft.

9. The system of claim 8, wherein the display unit processing unit is further configured to:

display an indicator of the availability of multimedia data on the three-dimensional diagram, and play the multimedia data when a user selects the indicator.

10. The system of claim 8, wherein the display unit processing unit is further configured to display wind vectors obtained from a weather service at selected points on the three-dimensional diagram.

11. The system of claim 7, wherein the display unit processing unit is further configured to permit a user to annotate specific points of the flight.

12. The system of claim 7, wherein the display unit processing unit is further configured to display a graph showing a time dependency of at least one of the following aspects of the flight data: altitude, airspeed, ground speed, vertical speed, and ground course.

13. The system of claim 7, wherein the display unit processing unit is further configured to provide a user with grades corresponding to the flight evaluation data, and wherein the grades correspond to individual segments of the flight evaluation data determined according to flight activities and to the entirety of the flight evaluation data.

14. The system of claim 7, wherein the display unit processing unit is further configured to display information from a plurality of selected flights, the information including at least one of the following: date, aircraft type, aircraft identified, departure airport, arrival airport, number of takeoffs and landings, air time, taxi time, and pilot name.

15. The system of claim 1, wherein the display unit processing unit is further configured to display the flight data over at least one of selected aviation charts; and satellite terrain images.

16. The system of claim 15, wherein the selected aviation charts include at least one of the following: sectional charts, instrument flight rules, enroute low and high altitude charts, and weather maps.

17. A flight display method performed by a computer, the method comprising:

establishing a secure connection with a remote database based on user credentials;

retrieving flight data and flight evaluation data from the remote database; and displaying the flight data and the flight evaluation data in graphical or text form, wherein the flight evaluation data includes information about pilot performance based on a comparison between the flight data, including an actual flight path and flight parameters flown, and user-specified intentions defining an intended flight path and flight parameters.

18. The method of claim 17, wherein the flight evaluation data further includes at least one of the following:

quality data;

accuracy data;

data relating to conformance to regulations and procedures; and flight safety data.

19. The method of claim 17, wherein the flight data comprises at least one of the following:

climb and descent rates;

rates of turning;

air and ground speed;

heading and ground course; and audio recordings.

20. The method of claim 17, further comprising sharing the flight data and flight evaluation data between multiple users via electronic means including at least one of social networking, e-mail, and url sharing.

21. The method of claim 17, further comprising:

adding new flight procedures defining intended flight parameters; and edit existing flight procedures defining intended flight parameters.

22. The method of claim 17, further comprising:

graphically displaying flight data and flight evaluation data in three dimensions, and graphically displaying flight data and flight evaluation data from a plurality of selected flights, wherein the displayed flight data and flight evaluation data is segmented into discrete flight portions according to flight activities; and wherein a portion of the graphically displayed flight data corresponding to a particular flight segment is are color coded and textually annotated with a portion of the flight data and flight evaluation data corresponding to the particular flight segment.

23. The method of claim 17, further comprising replaying selected portions of a selected flight by displaying variations in the flight data or flight evaluation data according to a flight time to which the flight data or flight evaluation data corresponds.

24. The method of claim 17, further comprising:

displaying a position of an aircraft on a three-dimensional diagram; and adjusting a viewing angle in accordance with the displayed position of the aircraft.

25. The method of claim 24, further comprising:

displaying an indicator indicating the availability of multimedia data on the three-dimensional diagram, and playing the multimedia data when a user selects the indicator.

26. The method of claim 24, further comprising displaying wind vectors obtained from a weather service at selected points on the three-dimensional diagram.

27. The method of claim 17, further comprising permitting a user to annotate specific points of the flight.

28. The method of claim 17, further comprising displaying a graph showing a time dependency of at least one of the following aspects of the flight data: altitude, airspeed, ground speed, vertical speed, and ground course.

29. The method of claim 17, further comprising providing to a user grades corresponding to the flight evaluation data, wherein the grades correspond to individual segments of the flight evaluation data determined according to flight activities and to the entirety of the flight evaluation data.

30. The method of claim 17, further comprising displaying information from a plurality of selected flights, the information including at least one of the following:

date, aircraft type, aircraft identified, departure airport, arrival airport, number of takeoffs and landings, air time, taxi time; and pilot name.

31. The method of claim 17, further comprising displaying the flight data over at least one of:

selected aviation charts; and satellite terrain images.

32. The method of claim 31, wherein the selected aviation charts include at least one of the following: sectional charts, instrument flight rules, enroute low and high altitude charts, and weather maps.

33. A non-transitory computer readable medium encoded with a computer program for implementing a flight display method, the computer program comprising instructions for:

establishing a secure connection with a remote database based on user credentials;

retrieving at least one of flight data and flight evaluation data from the remote database; and displaying at least one of the flight data and the evaluation data in graphical or text form, wherein the flight evaluation data includes information about pilot performance based on a comparison between the flight data, including an actual flight path and flight parameters flown, and user-specified intentions defining an intended flight path and flight parameters.

34. The non-transitory computer readable medium of claim 33, wherein the evaluation data further includes at least one of the following:

quality data;

accuracy data;

data relating to conformance to regulations and procedures; and flight safety data.

35. The non-transitory computer readable medium of claim 33, wherein the flight data comprises at least one of the following:

climb and descent rates;

rates of turning;

air and ground speed;

heading and ground course; and audio recordings.

36. The non-transitory computer readable medium of claim 33, wherein the computer program further comprises instructions for sharing the flight data and flight evaluation data between multiple users via electronic means including at least one of social networking, e-mail, and url sharing.

37. The non-transitory computer readable medium of claim 33, wherein the computer program further comprises instructions for:

adding new flight procedures defining intended flight parameters; and editing existing flight procedures defining intended flight parameters.

38. The non-transitory computer readable medium of claim 33, wherein the computer program further comprises instructions for:

graphically displaying flight data and flight evaluation data in three dimensions over satellite terrain images, and graphically displaying flight data and flight evaluation data from a plurality of selected flights, wherein the displayed flight data and flight evaluation data is segmented into discrete flight portions according to flight activities; and wherein a portion of the graphically displayed flight data corresponding to a particular flight segment is color coded and textually annotated with a portion of the flight data and flight evaluation data corresponding to the particular flight segment.

39. The non-transitory computer readable medium of claim 33, wherein the computer program further comprises instructions for replaying selected portions of a selected flight by displaying variations in the flight data or flight evaluation data according to a flight time to which the flight data or flight evaluation data corresponds.

40. The non-transitory computer readable medium of claim 33, wherein the computer program further comprises instructions for:

displaying a position of an aircraft on a three-dimensional diagram; and adjusting a viewing angle in accordance with the displayed position of the aircraft.

41. The non-transitory computer readable medium of claim 40, wherein the computer program further comprises instructions for:

displaying an indicator of the availability of multimedia data on the three-dimensional diagram, and playing the multimedia data when a user selects the indicator.

42. The non-transitory computer readable medium of claim 40, wherein the computer program further comprises instructions for displaying wind vectors obtained from a weather service at selected points on the three-dimensional diagram.

43. The non-transitory computer readable medium of claim 33, wherein the computer program further comprises instructions for permitting a user to annotate specific points of the flight.

44. The non-transitory computer readable medium of claim 33, wherein the computer program further comprises instructions for displaying a graph showing a time dependency of at least one of the following aspects of the flight data: altitude, airspeed, ground speed, vertical speed, and ground course.

45. The non-transitory computer readable medium of claim 33, wherein the computer program further comprises instructions for providing to a user grades corresponding to the flight evaluation data, and wherein the grades correspond to individual segments of the flight evaluation data determined according to flight activities and to the entirety of the flight evaluation data.

46. The non-transitory computer readable medium of claim 33, wherein the computer program further comprises instructions for displaying information from a plurality of selected flights, the information including at least one of the following:

date, aircraft type, aircraft identified, departure airport, arrival airport, number of takeoffs and landings, air time, taxi time; and pilot name.

47. The non-transitory computer readable medium of claim 33, wherein the computer program further comprises instructions for displaying the flight data over at least one of:

selected aviation charts; and satellite terrain images.

48. The non-transitory computer readable medium of claim 47, wherein the selected aviation charts comprise at least one of the following: sectional charts, instrument flight rules, enroute low and high altitude charts, and weather maps.

49. A flight display system comprising:

means for securely accessing a flight database storing flight data and flight evaluation data based on user credentials;

means for obtaining at least one of flight data and flight evaluation data from the flight database;

means for processing obtained flight data and evaluation data; and means for displaying at least one of the obtained flight data and flight evaluation data in graphical or text format, wherein the flight evaluation data includes information about pilot performance based on a comparison between the flight data, including an actual flight path and flight parameters flown, and user-specified intentions defining an intended flight path and flight parameters.

* * * * *

UNITED STATES PATENT AND TRADEMARK OFFICE

CERTIFICATE OF CORRECTION

PATENT NO. : 8,665,121 B2
APPLICATION NO. : 13/073941
DATED : March 4, 2014
INVENTOR(S) : Tsachi C. Shavit It is certified that error appears in the above-identified patent and that said Letters Patent is hereby corrected as shown below:

In the Claims

Claim 22, Col. 25, Line 12, “is are” should read --is--.

Signed and Sealed this
Twenty-fourth Day of June, 2014

Michelle K. Lee

Michelle K. Lee
*Deputy Director of the United States Patent and Trademark Office*